(12) United States Patent
Hodge

(10) Patent No.: US 11,069,044 B1
(45) Date of Patent: Jul. 20, 2021

(54) ELIMINATING IMAGE ARTIFACTS USING IMAGE-LAYER SNAPSHOTS

(71) Applicant: Adobe Inc., San Jose, CA (US)

(72) Inventor: Bruce Allen Hodge, Palo Alto, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/822,460

(22) Filed: Mar. 18, 2020

(51) Int. Cl.
| | | |
|---|---|---|
| G06T 11/40 | (2006.01) | |
| G06T 5/50 | (2006.01) | |
| G06T 5/00 | (2006.01) | |
| G06K 9/36 | (2006.01) | |
| G06K 9/40 | (2006.01) | |
| G06K 9/46 | (2006.01) | |
| H04N 1/60 | (2006.01) | |
| H04N 9/64 | (2006.01) | |
| H04N 9/69 | (2006.01) | |
| H04N 9/76 | (2006.01) | |

(52) U.S. Cl.
CPC ............... *G06T 5/50* (2013.01); *G06T 5/005* (2013.01); *G06T 11/40* (2013.01); *G06T 2207/20104* (2013.01); *G06T 2207/20221* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,877,762 A | * | 3/1999 | Young | G06F 3/033 345/620 |
| 2003/0179214 A1 | * | 9/2003 | Saund | G06T 11/60 345/619 |
| 2014/0189576 A1 | * | 7/2014 | Carmi | G06K 9/6204 715/781 |
| 2015/0145835 A1 | * | 5/2015 | Vandermeijden | G06F 3/0446 345/178 |
| 2016/0335789 A1 | * | 11/2016 | Zhang | G06T 7/194 |
| 2020/0058390 A1 | * | 2/2020 | Kohle | G16H 50/20 |

* cited by examiner

*Primary Examiner* — Wesner Sajous
(74) *Attorney, Agent, or Firm* — Kilpatrick Townsend & Stockton LLP

(57) ABSTRACT

Methods and systems disclosed herein relate generally to systems and methods for using image-layer snapshots to eliminate image artifacts. A pixel-adjustment module receives an indication of the selected region within a first image layer of an image. In response, the pixel-adjustment module generates a first snapshot of the first image layer, in which the first snapshot includes pixel data for restoring a first state of the first image layer at which the selected region is yet to be modified. The pixel-adjustment module generates a second image layer, in which the image structure-modification operation is applied to the pixel of the second image layer that corresponds to the selected region. The pixel-adjustment module modifies a pixel in the selected region to include at least part of the pixel data from the first snapshot.

20 Claims, 12 Drawing Sheets

ELIMINATING IMAGE ARTIFACTS USING IMAGE-LAYER SNAPSHOTS

TECHNICAL FIELD

This disclosure relates generally to the field of image processing, and more specifically relates to using image-layer snapshots to eliminate image artifacts generated during image-editing operations.

BACKGROUND

Image-editing applications provide various tools for editing contents of the image. To perform an image-editing operation, a region within the image can be manipulated including (for example) modifications to its color, size, orientation, and location. The image-editing applications can additionally facilitate a manner in which the region is selected based on various types of interface operations. For example, a first type of interface operation can be executed to select a rectangular region within the image. In another example, a second type of interface operation can be executed to select a free-form region within the image, in which the free-form selection operation allows a user to manually draw edges forming a boundary of the free-form region. Once the region is selected, various tasks can be performed, such as converting pixels corresponding to the selected region into a different color or relocating the selected region into another part of the image.

These image-region selection operations can be convenient to a user, but may also cause a number of persistent problems. One problem is a "halo" effect that can occur when one or more pixels in an image display image artifacts when a selected region of the image is modified to indicate different color values and relocated to another location. Specifically, the halo effect is created on at least part of the image when a selected region having one or more pixels with alpha values less than 1 is modified to indicate a different color and is relocated to a different location of the image. As an example, a selected region may be enclosed with a boundary of pixels having alpha values that are less than 1. The selected region is filled with a particular color through a paint-bucket operation. When the selected region is moved from a first location to a second location, pixels corresponding to the boundary of the selected region at the first location may leave a trace of image artifacts, i.e., color residue on pixels that surround the selected region. This can be a consequence of the image-editing operation, when the expected result of the operation should not leave any image artifacts at the first location.

Another problem involving image-region selection operations includes several halo effects being unintentionally created each time when pixel values of the selected region is modified while the selected region is moved to other locations. For instance, a selected region is initially moved from a first location to a second location, at which a first image artifact has already been created at the first location. If the selected region is changed into a different color at the second location and is again moved to a third location, the image would depict the first image artifact at the first location and a second image artifact at the second location. Moreover, modifying the color of the selected region at the second region may unintentionally modify pixels of the second region itself as it is moved to the third location.

It can be beneficial to provide techniques that allow editing of selected regions while avoiding the introduction of artifacts in the image being edited.

SUMMARY

According to certain embodiments, a pixel-adjustment module accesses an image that includes a first image layer. The pixel-adjustment module receives an indication of a selected region within the first image layer. In response to receiving the indication of the selected region, the pixel-adjustment module generates a snapshot of the first image layer. The snapshot includes pixel data for restoring a state of the first image layer, in which the selected region is unmodified. The pixel-adjustment module detects an image structure-modification operation initiated for the selected region. In response to the detection, the pixel-adjustment module generates a second image layer, modifies a pixel of the second image layer to include the data from the selected region, and modifies a pixel in the selected region such that image structure-modification operation is not applied to the pixel in the selected region. The pixel-adjustment module applies the image structure-modification operation to the modified pixel of the second image layer. As the image structure-modification operation is being applied, the pixel-adjustment module uses pixel data from the snapshot to modify at least part of the first image layer, such that pixels corresponding to image artifacts in the first image layer can be restored based on the pixel data from the snapshot.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
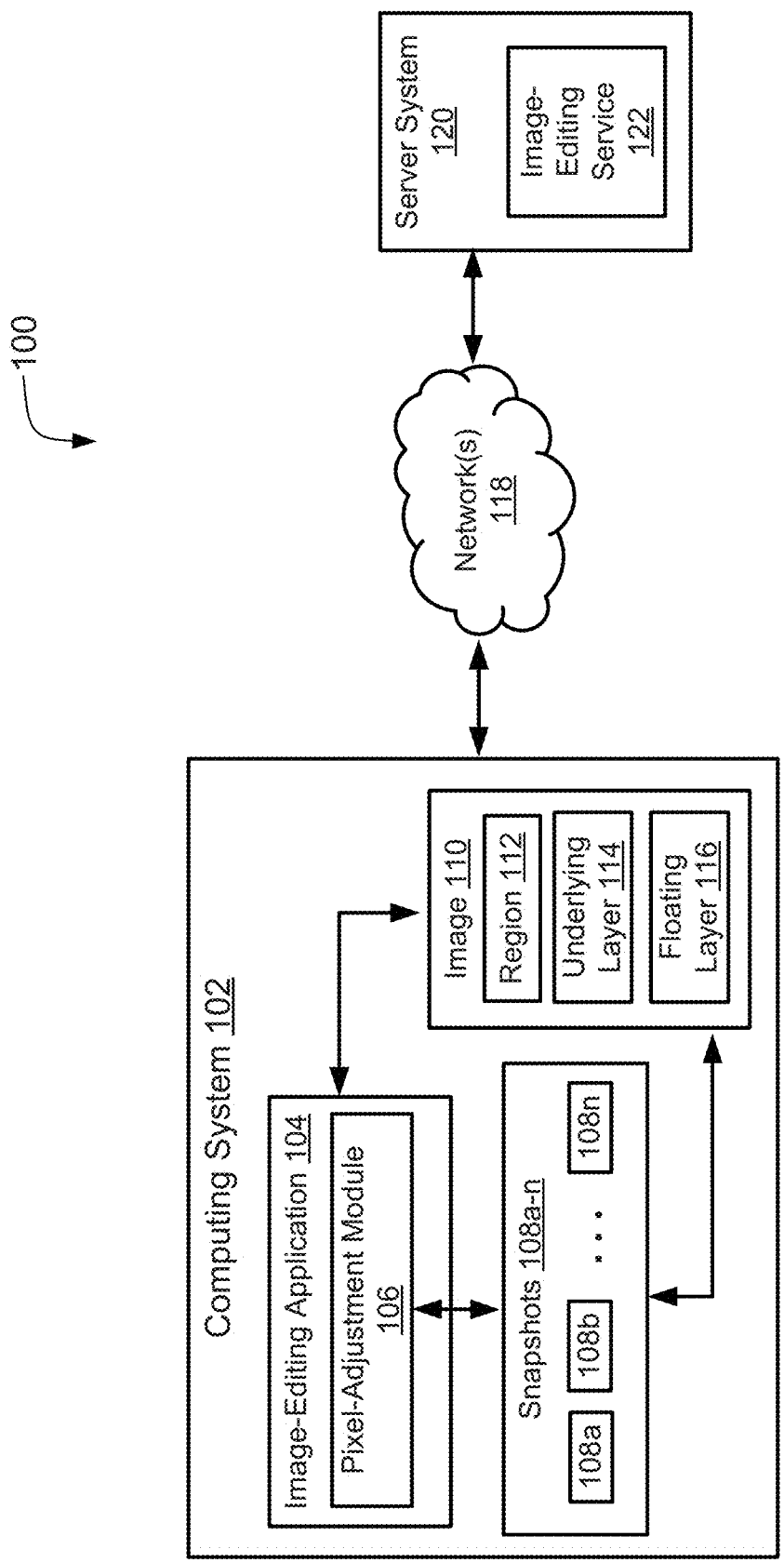
FIG. 1 depicts an example of a computing environment for eliminating image artifacts using image-layer snapshots, in accordance with some embodiments.

As discussed above, prior techniques for image-editing operations can cause unintended changes to a set of pixels of an image when a selected region of an image is modified with different pixel values and is relocated to another location of the image. The extent of these unintended changes depends on a type of operation for selecting the region and alpha values of pixels corresponding to the selected region in the image. Moreover, the prior techniques may cause additional image artifacts while a pixel-modification operation and the move operation are performed together on the selected region. In some cases, the prior techniques can discourage other image-editing operations to be performed on the selected region at least until the move operation has been completed. Certain embodiments described herein provide techniques for reducing unintended pixel modifications that are caused due to image-editing operations, as well as allowing various image-editing operations (e.g., a painting operation) to be performed on a selected region of the image as the selected region is being processed through another image operation (e.g., a move operation). In addition, the techniques can be implemented by generating snapshots of image layers before image-editing operations are performed. Pixel data of the image-layer snapshots are used to eliminate image artifacts and restore pixels that have been unintentionally modified. By executing the pixel-restoration operations, various types of image-editing operations can to be performed without unintentionally generating image artifacts on the image.

As an example, a pixel-adjustment module can generate image-layer snapshots of one or more layers of the image before image-editing operations are performed, such that the image-layer snapshots are used to eliminate image artifacts that can be created during subsequent image-editing operations (e.g., a move operation). The image-layer snapshot is used by the pixel-adjustment module to restore pixels that were unintentionally modified when the selected region is relocated to another location of the image. The image-layer snapshot can be used to restore a state of pixels corresponding to a part of the image layer. For example, as a region is selected from a first image layer (e.g., an underlying image layer) of the image, the pixel-adjustment module can generate an image-layer snapshot that captures the state of a first image layer. The state of the first image layer includes pixel data usable for restoring at least part of the first image layer. The pixel-adjustment module can use the pixel data of the image-layer snapshot to restore the color values (e.g., RGB values) and/or transparency values (e.g., alpha values) of pixels corresponding to the image artifacts, as the selected region is relocated to the other location. In some instances, restoring pixels corresponding to the image artifacts can improve accuracy of image-editing operations.

Continuing with the above example, the pixel-adjustment module can continue to capture image-layer snapshots while a structure-modification operation (e.g., rotate, move, resize) is performed on the selected region. When it is indicated that the structure-modification operation will be performed, the pixel-adjustment module generates a floating image layer. The floating image layer is a temporary image layer on which the selected region is copied and the structure-modification operation is applied. The pixel-adjustment module cuts the selected region from the underlying image layer and pastes the selected region into the floating image layer. The pixel-adjustment module generates an image-layer snapshot that corresponds to the underlying image layer without the selected region. After the selected region is added into the floating image layer, the structure-modification operation can be applied to the selected region at the floating image layer instead of the underlying image layer. During the structure-modification operation, the pixel-restoration operation is performed to restore pixels corresponding to one or more image artifacts caused by the structure-modification operation, thus removing the halo effects from the image. In some instances, other image-editing operations are performed (e.g., the pixel-modification operation) on the selected region of the floating image layer. In various embodiments, the pixel-adjustment module merges the modified selected region in the floating image layer into the underlying image layer in response to an indication that structure-modification operation has been completed. Before the layers are merged, the pixel-adjustment module generates yet another image-layer snapshot corresponding to the floating image layer, such that pixel data of the image-layer snapshot corresponding to the floating image layer can be used to restore a state of the floating image layer.

As presented herein, prior techniques may cause additional image artifacts to be generated when a pixel-modification operation is performed in between two or more structure-modification operations. In some instances, parts of the unselected region may be unintentionally added into the selected region when the pixel-modification operation is performed in between the two or more structure-modification operations. To address these challenges, the example pixel-adjustment module can replace an existing image layer with image layers generated from processing one or more of the generated image-layer snapshots. For example, an image-editing application that includes the pixel-adjustment module can receive additional image structure-modification operations to be performed for a selected region of a merged image layer. The pixel-adjustment module may determine that contents depicted in the selected region are same as those of a previously selected region. The pixel-adjustment module may retrieve image-layer snapshots corresponding to the previously selected region and process the image-layer snapshots to generate the floating image layer and the underlying image layer (e.g., without the selected region) for the area of the image corresponding to the selected region. The pixel-adjustment module may then replace the merged layer with the generated image layers. Accordingly, the additional image structure-modification operations can be applied towards the selected region of the generated floating image layer. By using the image-layer snapshots that correspond to the previously selected region, computing resources can be preserved which would have been spent on generating a new set of image layers as well as generating additional image-layer snapshots.

In some instances, operations to add the selected region to the floating image layer cause pixels along a boundary of the selected region to be unintentionally modified. For example, a cut-and-paste operation of the selected region into the floating image layer can decrease the alpha values of the set of pixels that are located at the boundary of the selected region. Alpha values can decrease during the cut-and-paste operation, such as during a cut operation that involves applying an image mask on pixels along the anti-aliased edges, then a paste operation that involves applying the image mask again on pixels along the anti-aliased edges of another image layer. The masking operations can cause a decrease of alpha values of pixels that correspond to the anti-aliased edges of the selected region. Lower alpha values indicate a higher degree of transparency and may compromise the image quality of the selected region. As such, the pixels located along the boundary of the selected region may become more transparent as several cut-and-paste operations are performed during image-editing operations.

In various embodiments, the pixel-adjustment module restores the alpha values of pixels that were unintentionally modified by the cut-and-paste operations to the selected region. After the selected region is added into the floating image layer, the pixel-adjustment module detects a set of pixels of the floating image layer that indicate alpha values that are less than a first predetermined threshold (e.g., a threshold value of 1). The pixel-adjustment module then identifies a subset of pixels from the set of pixels that correspond to an alpha value greater than a second predetermined threshold (e.g., a threshold value of 0). The subset of pixels may include pixels that correspond to edges corresponding to a boundary of the selection region. For the identified subset of pixels, the pixel-adjustment module converts each pixel of the identified subset to an alpha value of 1. Because alpha values of pixels along the boundary are modified to a lower degree of transparency, the pixel-adjustment module can restore the pixels to retain their original pixel data even when multiple cut-and-paste operations are performed. In some instances, the alpha-value restoration operations are performed by a shader hardware of a graphical processing unit (GPU).

The following example is provided to introduce certain embodiments of the present disclosure. In this example, a user of an image-editing application provides an indication of a selected region of an image by interacting with a user interface to perform a free-form selection operation in the image-editing application. As the region is selected, the image-editing application receives an indication a pixel-modification operation (e.g., a paint-bucket operation) from various user-interface operations of the image-editing application. As the pixel-modification operation is selected, a pixel-adjustment module included in the image-editing application generates a snapshot of an underlying image layer of the image.

The image-editing application initiates a structure-modification operation (e.g., a move operation) to the selected region, at which the pixel-adjustment module generates a floating image layer, cuts the selected region from the underlying image layer, and pastes the selected region to the floating image layer. The pixel-adjustment module generates another snapshot of the underlying image layer that excludes the selected region. The pixel-adjustment module causes the structure-modification operation to be applied to the selected region pasted in the floating image layer. As the structure-modification operation is being applied, the pixel-adjustment module processes the image-layer snapshot to restore the pixel data of pixels of the underlying image layer that correspond to one or more image artifacts. Accordingly, while various operations are executed for editing the selected region, the pixel-adjustment module applies pixel restorations that would refine and calibrate image quality of the image, such that a need to perform additional operations to revert unintended changes can be avoided.

As used herein, the terms "digital image" and "image" are used to refer to images including pixels, such as a raster image or a bitmap image. In some cases, an image includes a structure that is based on pixels, including a visual appearance (e.g., raster graphics) or a file format (e.g., .BMP, .JPG, .JPEG, .PNG). An image includes (for example) a quantity of pixels arranged in one or more arrays, and each pixel is associated with data describing the appearance of the pixel, such as color, location, transparency, saturation, or any other suitable visual characteristic. Additionally or alternatively, the image includes additional data associated with each pixel, such as directional data, image layers, printing information, or any other suitable type of data. An image is created and modified via a computing system, such as a computing system executing an image-editing application.

As used herein, the term "image-editing application" refers to an application, executed on a computing system, that is capable of creating or modifying an image. An image-editing application is executed, for example, on a personal computer, a personal mobile device (e.g., smartphone, tablet computer), a server, a virtual computing system (e.g., a virtual machine, a cloud service), or any other suitable computing system or combination of computing systems. An image-editing application includes image-editing operations, such as brushstrokes, editing operations, graphical effects, or any other suitable image editing operation. For example, an image-editing application includes a graphical user interface having one or more operations that can be initiated via inputs to the user interface. In some cases, an image-editing application enables image layers, such as by enabling assignment of one or more pixels to a layer of an image. For example, the image-editing application enables one or more layers to be designated as an active layer or an inactive layer. An active layer includes one or more pixels that are available for editing via the operations of the image-editing application. An inactive layer includes one or more pixels that are unavailable for editing (e.g., a "locked" layer). In some cases, an active (or inactive) layer is convertible to an inactive (or active) layer, such as in response to a user input to the graphical user interface.

As used herein, the term "image layer" is used to refer to a data structure comprised of pixels that represent one or more graphical content of an image. An image may include several image layers, in which content in a particular layer can be edited without affecting content corresponding to remaining image layers. In some instances, image layers are added, removed, or merged during image-editing operations. Additionally or alternatively, the order of layers can be changed at any time during the image-editing operations.

As used herein, the term "image-layer snapshot" is used to refer to a data structure that stores a state of pixels corresponding to an image layer at a particular point in time. In some embodiments, the image-layer snapshot includes one or more attributes (e.g., color, transparency, location) corresponding to each pixel of at least part of the image layer, such that the attributes are used to restore a corresponding pixel that was modified due to pixel-modification operations and/or structure-modification operations.

As used herein, the term "underlying image layer" is used to refer to an image layer from which other image layers can be generated. Additional image layers can be generated such that at least one of the additional image layers includes graphical content corresponding to at least part of an image represented by the underlying image layer.

As used herein, the term "floating image layer" is used to refer to an image layer which is generated to include content corresponding to at least part of an image represented by the underlying image layer. The floating image layer is similar in function to a normal layer, but may be merged back to the underlying image layer when image-editing operations on the floating image layer are completed.

As used herein, the term "pixel-modification operation" is used to refer to an image-editing operation that modifies color attributes of a particular pixel in an image. For example, the pixel-modification operation may include a painting operation, which may change pixels to have blue color data (for example) as the painting operation is applied to a portion of the image. Other examples of the pixel-modification operation may include, but are not limited to, a path operation, a stroke operation, a paint-bucket operation, and a fill operation.

As used herein, the term "structure-modification operation" is used to refer to an image-editing operation that transforms a structure of a selected region of the image. In some instances, the image structure-modification operation is a scale operation usable for changing a size of the selected region. Other examples of the image structure-modification operation may include, but are not limited to, a rotate operation, a skew operation, a stretch operation, a warp operation, a move operation, a distort operation, a perspective operation, and a flip operation.

As used herein, the term "alpha value" is used to refer to an attribute of a pixel that indicates a degree of transparency or opacity corresponding to the pixel. In some embodiments, the alpha value is represented as a percentage value ranging between 0% and 100% that is indicative of a degree of transparency/opacity of the corresponding pixel. Additionally or alternatively, the alpha value is represented as a floating number ranging between 0 and 1, which indicates a degree of transparency/opacity of the corresponding pixel. In various embodiments, a higher alpha value indicates lower transparency and higher opacity, while a lower alpha value indicates higher transparency and lower opacity.

As used herein, the term "pixel-restoration operation" is used to refer to an image-editing operation that uses pixel attributes stored in an image-layer snapshot to restore image data corresponding to one or more modified pixels of a given image layer.

As used herein, the term "image artifact" or "visual artifact" is used to refer to a feature appearing in an edited image which was not present in an original image. The image artifact is sometimes the result of improper operation of an image-capturing device (e.g., a camera), but may also be unintentionally created based on image-editing operations of an image-editing application.

An Overview of a Computing Environment for Eliminating Image Artifacts Using Image-Layer Snapshots Referring now to the drawings, FIG. 1 depicts an example of a computing environment 100 for eliminating image artifacts using image-layer snapshots. The network environment 100 includes a computing system 102 that executes an image-editing application 104. The image-editing application 104 includes a pixel-adjustment module 106. In various embodiments, the image-editing application 104 is executed on another suitable computing system or combination of computing systems, including the computer system 102 and a personal mobile device (not shown). In various embodiments, the image-editing application provides a graphical user interface ("GUI") (not shown) with which a user may interact with an image 110 using an input/output device (e.g., a mouse, a keyboard, a touchscreen).

In some embodiments, the image-editing application 104 executes, in response to a user input, image-editing operations, including brushstrokes, editing operations, graphical effects, or any other suitable image editing operation, which can individually or in combination be used to edit the image 110. An image-editing operation can be performed on a part of an image, a region of the image, or one or more image layers corresponding to the region and/or the image. In various embodiments, the image-editing operation includes a pixel-modification operation that can be used to modify color attributes of a pixel of the image or the region of the image. By modifying the color attributes, the image can be edited to produce an output image with a different color content. The image-editing operation also includes a structure-modification operation. The structure-modification operation is used to transform structural properties corresponding to the image and/or the region. In some cases, the pixels corresponding to the region can be relocated such that those pixels are present in another location of the image. Other types of the structure-modification operation include (for example) a scale operation, a rotate operation, and a flip operation.

The image-editing application 104 accesses the image 110 and presents the image 110 on the GUI of the computing system 102. In various embodiments, an image region 112 is selected from the image 110 using one or more operations of the image-editing application 104. The image region 112 includes at least part of content represented in the image 110. The image-editing application 104 provides a set of user-interface operations that can be executed to select the image region 112. A user-interface operation for selecting the region 112 may include (for example) a free-form selection, a marquee-selection, or an auto-selection operation.

In some embodiments, the image 110 is depicted on an underlying image layer 114, and a part of the image 110 (e.g., the image region 112) is depicted on a floating image layer 116. In some embodiments, the image-editing application 104 accesses the image 110 and performs a layer-creation operation to generate the underlying image layer 114 and/or the floating image layer 116. As indicated above, the image layers can be added, modified, and/or removed by using a set of user-interface operations of the image-editing application 104. For example, the image 110 can include the underlying image layer 114 and the floating image layer 116, but may be modified to include additional image layers. Each of the additional image layers may include graphical content that depicts a part of the image 110.

In various embodiments, the image layers, including the underlying image layer 114 and the floating image layer 116, are modified or rearranged to change one or more attributes associated with the image 110. For example, the image layers can be overlaid on top of each other to collectively depict an entirety of the image 110. In some instances, one or more image layers (e.g., the floating image layer 116) of the image are temporary image layers. A temporary image layer is an image layer that is deleted or merged into another image layer once a set of image-editing operations are completed. In various embodiments, the image 110 is locally stored at the computing system 100, accessed from a third-party service over a data network, accessed from a shared network volume, or otherwise accessible to the computing system 102.

The pixel-adjustment module 106 includes program code executing within the image-editing application 104. In some embodiments, the pixel-adjustment module 106 executes a set of instructions as a background process to the GUI, and performs one or more operations that involve generating image-layer snapshots 108a-n at particular time points. For example, the pixel-adjustment module detects an indication that an image-editing operation is about to be executed. The indication may include a user clicking a user-interface object corresponding to a structure-modification operation after the region 112 was selected from the image 110. Before interactions with the GUI are performed, the pixel-adjustment module 106 generates an image-layer snapshot 108a of an image layer of the image 110. The pixel-adjustment module 106 captures a plurality of image-layer snapshots, responsive to the image-editing operations that are performed to edit the image 110 and/or the image region 112. In various embodiments, the pixel-adjustment module 106 accesses at least one of the image-layer snapshots 108a-n during the image-editing process (e.g., a move operation) and uses pixel data from such image-layer snapshots to restore any pixels of an image layer (e.g., an underlying image layer) that have been unintentionally modified. In some cases, restoring pixels using pixel data from the image-layer snapshots 108a-n can eliminate artifacts that were created in the image.

Consider an example scenario in which a region (e.g., the region 112) of a raster image (e.g., the image 110) is selected through a free-form selection operation of the image-editing application 104. For example, a user can interact with the GUI of the image-editing application 104 to draw each edge of a boundary of the image region. Because the raster image displays graphical content through a plurality of rectangular pixels, the free-form selection operation typically designates a boundary that includes a set of pixels that surround the selected region. In some cases, edges of the boundary formed by pixels can appear smooth (e.g., to a user viewing the selection) if the boundary is horizontal or vertical, but a diagonal boundary could appear as a staircase of pixels or jagged edges of pixels. To address this issue, the staircase of pixels can be smoothed out by an anti-aliasing operation associated with the image-editing application 104. For example, the anti-aliasing operation can modify alpha values of one or more pixels corresponding to the diagonal boundary such that pixels that cause the appearance of jagged edges can be rendered as transparent. In some instances, the alpha values of pixels corresponding to a boundary of the selected region may be configured to gradually decrease to 0 as the pixels approach the outer regions of the boundary. Such gradual decrease of alpha values may refer to a "feathering operation" and an edge-softening operation in the image-editing application 104. Additionally or alternatively, alpha values of pixels within the selected region may correspond to values less than 1, which indicate some varying degrees of transparency.

In some cases, the anti-aliasing operation and/or edge-softening operation can cause unintended changes and create image artifacts when subsequent structure-modification operations are performed. For example, a paint-bucket operation converts a set of contiguous pixels in the selected region to another Red, Green, and Blue ("RGB") value. When the selected region with the converted color is relocated to another location, any pixels of the selected region indicating some degree of transparency may leave a trace of color in the original location of the selected region. To address this issue, the pixel-adjustment module 106 identifies a set of pixels in which alpha values are less than a predetermined threshold (e.g. alpha value 1). In various embodiments, the identification of the set of pixels can be performed when the structure-modification operation is being performed. In the identified set of pixels, the pixel-adjustment module 106 uses an image-layer snapshot 108b (for example) to identify a subset of pixels in the underlying image layer that have different color values from the corresponding pixels of the image-layer snapshot 108b. The pixel-adjustment module 106 then uses corresponding pixel values stored in the image-layer snapshot (e.g., image-layer snapshot 108b) to restore the RGB and/or alpha values corresponding to each pixel of the subset of pixels. By restoring the pixel data of the identified subset of pixels, the pixel-adjustment module 106 can eliminate image artifacts.

In some instances, the pixel-adjustment module 106 uses the image-layer snapshots 108a-n to generate new image layers usable for replacing an image layer (e.g., the underlying image layer 114). For example, the image-editing application 104 receives additional image structure-modification operations to be performed for the selected region having a same size, same content, and same location of a previously selected region (e.g., the image region 112). In response, the pixel-adjustment module 106 retrieves image-layer snapshots (e.g., the image-layer snapshots 108a-n) corresponding to the previously selected region and processes the image-layer snapshots to generate a new floating image layer and a new underlying image layer (without the selected region) for the selected region. The pixel-adjustment module may then replace the existing image layer with the new image layers. The additional image structure-modification operations of the image-editing application 104 are applied towards the selected region of the new floating image layer.

In various embodiments, the computing system 102 communicates with a server system 120 via a communication network 118. The communication network 118 may be any type (or types) of network that facilitates communications between the computing system 102 and the server system 120. The communication network 118 may support various data communication protocols including, without limitation, wired and wireless protocols. Merely by way of example, the communication network 118 can be the Internet, a local area network (LAN), an Ethernet, a wide-area network (WAN), a virtual private network (VPN), an intranet, an extranet, a public switched telephone network (PSTN), and the like.

In some embodiments, the image-editing application 104 is offered as an image-editing service 122 under a Software as a Service (SaaS) model. One or more users may subscribe to the image-editing service 122, such that image-editing service 122 may enable one or more image-editing operations to be performed on the image 110, and the server system 120 performs the processing to provide the image-editing service 122 to subscribers. In some embodiments, the image-editing service 122 is a content management service that provides program assets usable for the image-editing application 104 of the computing system 102. In some embodiments, the image-editing service 122 is accessible by one or more user devices without using the image-editing application 104. Alternatively or additionally, the pixel-adjustment module 106 is executed in the computing system 102 while the image-editing service 112 enables one or more image-editing operations to be applied to the image 110. These illustrative examples depicting the operating environment of the image-editing application 104 are given to introduce the reader to the general subject matter discussed here and are not intended to limit the scope of the disclosed concepts. Other types of content delivery and operating environments can be contemplated by those skilled in the art.

In some embodiments, the computing system 102 accesses the image-editing service 122 by using a browser application or client application other than the image-editing application 104. The browser application or other client application accesses a GUI transmitted by the image-editing service 122. The GUI presented in the browser application can be used to edit the image 110 on the computing system 102. Additionally or alternatively, the image-editing application 104 can include software that is persistently stored on the computing system 102, software that is temporarily stored on the computing system 102 when a session is established with the image-editing service 112, or some combination thereof.

In some embodiments, the computing system 102 communicates with the image-editing service 122 using a suitable application programming interface ("API"). In some embodiments, the computing system 102 receives user commands via image-editing application 104. In some embodiments, the user commands cause the computing system 102 to transmit various function calls that are formatted in accordance with API rules. The computing system 102 routes these function calls to various modules of the image-editing service 122. In other embodiments, the computing system 102 transmits the function calls to the image-editing service 122, which responds by retrieving data objects usable for performing one or more image-editing operations in accordance with API rules and transmitting the data objects the image-editing application 104 for further processing.

The server system 120 may include one or more remote server computers that provide the services offered by the image-editing service 122. The remote server computers include any suitable non-transitory computer-readable medium for storing program code (e.g., code implementing the image-editing service 122), program data, or both, which is used by the server system 120 for providing the services to the computing system 102. A non-transitory computer-readable medium can include any electronic, optical, magnetic, or other storage device capable of storing computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1108 can include volatile memory, non-volatile memory, or a combination thereof. Any other suitable systems or subsystems that perform one or more operations described herein (e.g., one or more development systems for configuring an interactive user interface) can also be implemented by the server system 120.

Figure 2:
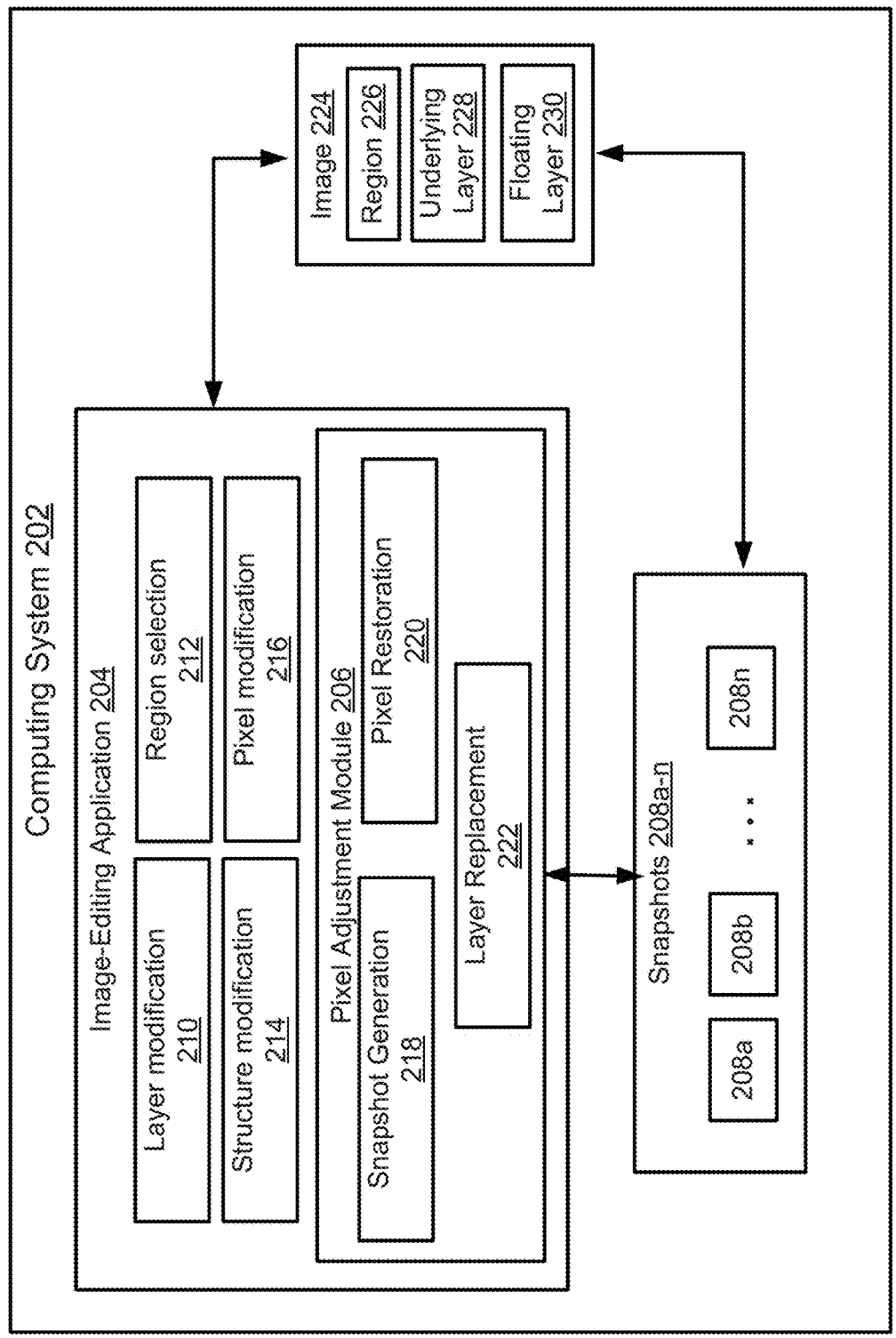
FIG. 2 depicts an example system architecture of a computing system for eliminating image artifacts using image-layer snapshots, in accordance with some embodiments.

A System Architecture for Eliminating Image Artifacts Using Image-Layer Snapshots FIG. 2 depicts an example system architecture 200 of a computing system 202 for eliminating image artifacts using image-layer snapshots. The computing system 202 includes an image-editing application 204 (e.g., the image-editing application 104 of FIG. 1). The image-editing application 204 provides various operations, including a layer-modification operation 210, a region-selection operation 212, a structure-modification operation 214, and a pixel-modification operation 216. In various embodiments, the layer-modification operation 210 is executed to generate, remove, rearrange, or modify one or more image layers that correspond to an image 224, including an underlying image layer 228 and a floating image layer 230. In some embodiments, the image-editing application 204 accesses the image 224 and performs layer-creation operation to generate the underlying image layer 228 and the floating image layer 230. In some embodiments, the layer-modification operation 210 adds or removes at least part of the image 224 (e.g., the image region 226) from a first image layer to a second image layer.

In various embodiments, image layers have various rules or relationships, which can be configured by the layer-modification operation 210. In some embodiments, the layer-modification operation 210 generates an image layer each object or asset of an imported image (e.g., the image 224). In other embodiments, the layer-modification operation 210 generates the image layers such that a given image layer includes multiple objects or graphical assets. In various embodiments, the objects included in or otherwise associated with the image layer include a variety of data types and include text, images, video, animation, illustrations, audio, etc. In some embodiments, the layer-modification operation 210 logically groups the image layers. For example, in some embodiments, consecutive image layers are able to be assigned to a folder and one or more properties or states may be set for all of the image layers in the folder. In some embodiments, a folder has a location or placement in a composition with respect to other image layer(s) and/or folder(s) and/or there may be multiple image layers of hierarchy (e.g., a folder within another folder).

In some embodiments, the layer-modification operation 210 may designate a image layer as a hidden image layer. For example, some applications may have the default state of the image layer be "displayed" but a state of such image layer can be converted to "hidden." A hidden image layer is not displayed on the GUI of the image-editing application 204. In some embodiments, a hidden layer is locked or otherwise is not able to be selected and/or operated on (e.g., to edit an object in the layer, move the layer up/down, etc.).

In various embodiments, the region-selection operation 212 is used to select all or any part of the image 224 to perform other types of image-editing operations. A region in the image, the image, and/or an image layer can be selected via the region-selection operation 212 for data manipulation of any kind—duplication in a layer, color correction, deletion, rotation, and so on. The selected region can include a set of pixels—fully or partially selected—contained within the boundary of the selected region. In some embodiments, a type of the region-selection operation 212 is a crop operation, which can be used to select a particular area of an image and discard the portions outside the chosen section. In some embodiments, another type of the region-selection operation 212 is a slice and slice select operations, like the crop operation, are used in isolating parts of images (e.g., the image 224). The slice operation can be used to divide an image into different sections. In various embodiments, the region-selection operation 212 is configured to perform an edge-softening operation, in which alpha values of pixels corresponding to a boundary of the image region 226 is decreased such that the edges of the image region 226 appear fuzzy.

In various embodiments, the region-selection operation 212 allows a particular geometric shape to be configured when selecting the image region. For example, the region-selection operation 212 includes a selection of a single row, single column, rectangular and elliptical region within the image 224. In some embodiments, an area that has been selected is edited without affecting the remaining parts of the image. In some embodiments, the region-selection operation 212 includes a free-form selection operation which allows manual drawing of the boundary to select the image region. Examples of the free-form selection operation include a lasso operation (e.g., regular, polygonal, magnetic), in which the user can make a custom selection by drawing one or more edges of the region 226 freehand. Additionally or alternatively, the region-selection operation 212 detects one or more edges corresponding to the boundary of an image once a starting point is received. To detect the one or more edges, the region-selection operation 212 can examine color data of pixels as the cursor moves over the desired area. In some cases, the region-selection operation 212 can be performed automatically without user input.

In some embodiments, the region-selection operation 212 is performed based on a selection of a region surrounded by edges, and the region 226 is expanded by additional selection operations subsequent to the initial selection. As such, an area corresponding to the region 226 can be added onto as much as possible without starting over. In some embodiments, a graphical indication (e.g., "marching ants") can identify one or more edges that correspond to the border of the region 226. Once the region-selection operation 212 is completed, the region 226 can be edited without affecting the rest of the image 224.

Additionally or alternatively, the region-selection operation 212 selects areas based on pixels corresponding to similar values. A user-input may cause the region-selection operation 212 to select all neighboring pixels of similar value within a predetermined tolerance level. The predetermined tolerance level can be adjusted to allow the region-selection operation 212 to determine values needed to evaluate the pixels for selection the region 226.

In some embodiments, the region-selection operation 212 includes performing an anti-aliasing operation. Aliasing can refer to a visual appearance (e.g., visible to a user) that includes stair-stepping of edges in an image, such as when the region 226 is selected from the image 224. In various embodiments, the anti-aliasing operation performs smoothing of jagged edges in the region 226 by averaging the colors of the pixels at the boundary of the region 226. As such, the anti-aliasing operation can be used to blend the pixels corresponding to the boundary of the region 226 and reduces the aesthetically jarring effect of sharp, step-like boundaries that appear in the aliased edges of the region 226. In some embodiments, the anti-aliasing operation includes determining what percentage of the pixel is occupied by the boundary of the region 226 and uses that percentage as the color for smoothing of the jagged edges.

The structure-modification operation 214 may include an image-editing operation that transforms a structure of a selection region of the image. In some instances, the image structure-modification operation is a scale operation usable for changing a size of the selected region (for example). Other examples of the image structure-modification operation may include, but are not limited to, a rotate operation, a skew operation, a stretch operation, a warp operation, a move operation, a distort operation, a perspective operation, and a flip operation. For example, the move operation can be used to drag the entirety of a single image layer. In some instances, the move operation also includes manually relocating the selected region of from a first area of an image to a second area of the image within a canvas of the GUI.

The pixel-modification operation 216 may include an image-editing operation that changes color attributes of a particular pixel in an image. The pixel-modification operation 216 can modify pixels to a particular color (for example) in response to a user input towards a portion of the image corresponding to the pixels. In another example, the pixel-modification operation 216 may include a paint-bucket operation, which can fill adjacent pixels that are similar in color value to the pixels selected via user input. The pixel-modification operation 216 may include a path operation (e.g., fill a path of pixels with a particular color), a stroke operation (e.g., add colored pixels to a path), and a fill operation (e.g., add colored pixels in an area defined by a path).

As the image-editing application 204 performs one or more operations to edit contents of the image 224, the pixel-adjustment module 206 performs one or more operations to restore one or more pixels that were unintentionally modified due to the image-editing operations. For example, the anti-aliasing operation and/or the edge-smoothing operation associated with the region-selection operation 212 decreases alpha values corresponding to the set of pixels located at proximity the boundary of the region 226, thus causing the set of pixels to be more transparent. In some instances, one or more pixels in the selected region may correspond to alpha values that are less than 1, showing varying degrees of transparency. The pixel-modification operation 218 can modify color values of the set of pixels of the selected region that at a first location of the underlying image layer even when the selected region is relocated to a second location of the image. This color residue of pixels remaining at the first location may cause a halo effect (for example). To remove the unintended halo effects from the image 224, the pixel-adjustment module 206 may execute a snapshot-generation operation 218, a pixel restoration operation 220, and a layer-replacement operation 222.

In some embodiments, the pixel-adjustment module 206 includes a snapshot-generation operation 218 to generate image-layer snapshots as the image structure-modification operation 214 (e.g., rotate, move, resize) is performed on the selected region 226. As indicated herein, the image-layer snapshots 208a-n may capture states of image layers which can be used, individually or in combination, to restore color values of pixels of a corresponding image layer. When a user input indicates that the structure-modification operation 214 is to be performed, the snapshot-generation operation 218 generates one or more of the image-layer snapshots 208a-n corresponding to at least one image layer at particular time points. For example, the snapshot-generation operation 218 may generate an image-layer snapshot 208a that corresponds to the underlying image layer 228 from which the region 226 was removed due to a cut operation. In another example, the snapshot-generation operation 218 generates another image-layer snapshot 208b that corresponds to the floating image layer 230 when the structure-modification operation 214 is completed, such that pixel data of the image-layer snapshot 208b corresponding to the floating image layer 230 can be used to replace another image layer during subsequent image-editing operations.

In some embodiments, the pixel-adjustment module 206 includes a pixel-restoration operation 220 to use the pixel data of the image-layer snapshot to restore the color values corresponding to pixels associated with the region 226 or a set of pixel surrounding the boundary of the region 226. In various embodiments, the image-layer snapshot includes one or more attributes (e.g., an RGB value) corresponding to each pixel of at least part of the image layer (e.g., the underlying image layer 228), and the attributes can be used to restore a corresponding pixel that was modified due to the pixel-modification operation 216 and/or the structure-modification operation 214. The pixel-restoration operation can continue to restore pixel values as the selected region is further modified and transformed during the image-editing operations (e.g., the move operation).

In some embodiments, the pixel-adjustment module 206 includes a layer-replacement operation 222 for replacing an existing image layer to image layers derived from one or more of the generated image-layer snapshots 208a-n.

Responsive to the pixel-adjustment module 206 determining that a selected region of an image layer corresponds to a previously selected region of the image 224, the pixel-adjustment module 206 retrieves image-layer snapshots 208a-n corresponding to the previously selected region and processes the image-layer snapshots to generate a new floating image layer and a new underlying image layer (without the selected region) for the selected region. The pixel-adjustment module 206 may then replace the merged layer with the new image layers. The additional image structure-modification operations can be applied towards the selected region of the restored floating image layer. In various embodiments, the above sequence of operations are performed repeatedly until other types of image-editing operations on the image 224 cause the data of the image-layer snapshots 208a-n to be outdated.

Example Process for Eliminating Image Artifacts Using Image-Layer Snapshots

Figure 3:
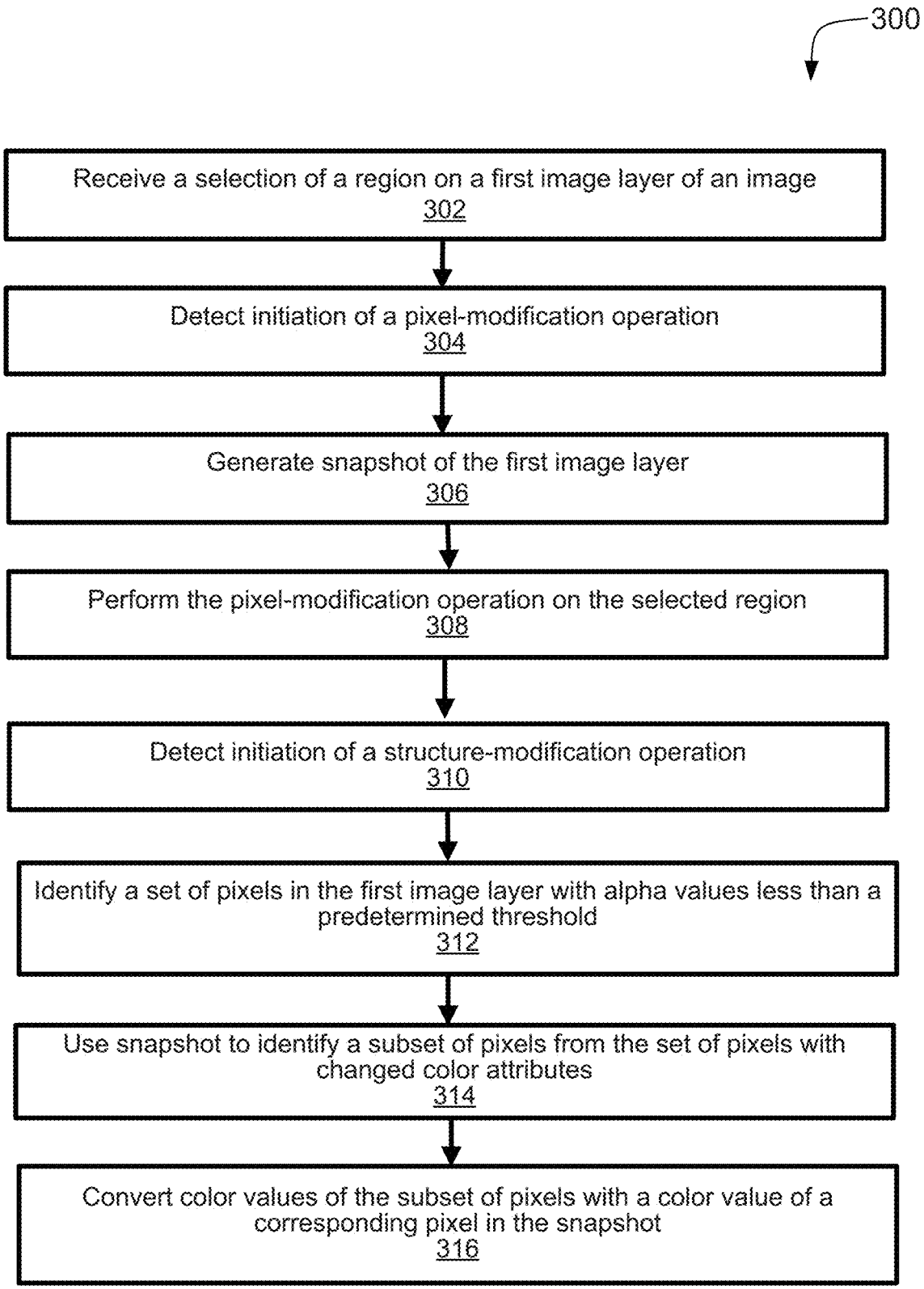
FIG. 3 shows an example of a process for eliminating image artifacts using image-layer snapshots, in accordance with some embodiments.

FIG. 3 shows an example of a process 300 for eliminating image artifacts using image-layer snapshots. At step 302, an image-editing application, such as the image-editing application 204, receives a selection of a region on a first image layer of an image. In some embodiments, the image layer represents one or more graphical elements of an image. An image may include several image layers, in which content in a particular layer can be edited without affecting content corresponding to other image layers. In various embodiments, the first image layer includes an underlying image layer, such as the underlying image layer 228 in the image 224. The region, such as the region 226, can be selected based on one or more region-selection operations including a lasso, a magic wand, and/or other selection operations. In some instances, one or more edges of the region 226 include pixels with alpha values that correspond to a degree of transparency.

At step 304, a pixel-adjustment module (e.g., the pixel-adjustment module 206 of FIG. 2) detects an initiation of a pixel-modification operation, such as the pixel-modification operation 216, or any other image-editing operation that changes pixel attributes of a particular pixel in an image. For example, the indication may include a user clicking a user-interface object corresponding to a paint-bucket operation after the region was selected from the image. At step 306, before the pixel-modification operation is performed, the pixel-adjustment module generates an image-layer snapshot (e.g., the image-layer snapshot 108a of FIG. 1) of the first image layer. In various embodiments, the image-layer snapshot stores the state of an image layer at a particular point in time. Specifically, the snapshot stores one or more attributes corresponding to each pixel of at least part of the image layer, such that the attributes are used to restore any corresponding pixels of the first image layer that may be modified due subsequent image-editing operations. For example, the snapshot stores Red, Green, Blue, and Alpha value ("RGBA") values corresponding to each pixel of the image layer, to restore modified pixels to their original RGBA values. As a result, restoration of modified pixels can eliminate image artifacts unintentionally created during an image-editing process.

At step 308, the pixel-modification operation is performed. The pixel-adjustment module detects an initiation of a structure-modification operation (such as at step 310). In various embodiments, the structure modification operation (e.g., the structure-modification operation 214 of FIG. 2) includes a move operation, in which the selected region with the modified pixels can be relocated to another location of the image. During the structure-modification operation, the pixel-adjustment module identifies a set of pixels in the first image that correspond to alpha values below a predetermined threshold (such as at step 312). In some embodiments, the predetermined threshold is alpha value 1, such that each pixel of the identified set of pixels indicate a degree of transparency. In some instances, the predetermined threshold indicates a value sufficient to identify any pixels that may correspond to an image artifact. Additionally or alternatively, the set of pixels can be identified solely from a part of the image that corresponds a location at which the selected region was selected.

At step 314, the pixel-adjustment module uses the image-layer snapshot to identify a subset of pixels from the set, in which each pixel of the subset indicates a change of color attributes. For example, a pixel of the identified subset can correspond to the pixel in the selected region having an alpha value of 0.5 and indicate a change of color from blue to red. In some instances, the pixel-adjustment module uses a corresponding pixel value stored in the image-layer snapshot to compare the RGB and alpha values of each pixel of the set of pixels.

At step 316, the pixel-adjustment module converts RGB values of each pixel of the identified subset of pixels with an RGB value of a corresponding pixel in the image-layer snapshot. In some cases, the image-layer snapshots are used to restore color changes to pixels that likely correspond to an image artifact. In effect, the image artifact (e.g., the halo effect) is removed from the image. In some embodiments, a graphical processing unit ("GPU") performs the pixel-restoration operations. Process 300 terminates thereafter.

Figure 4A:
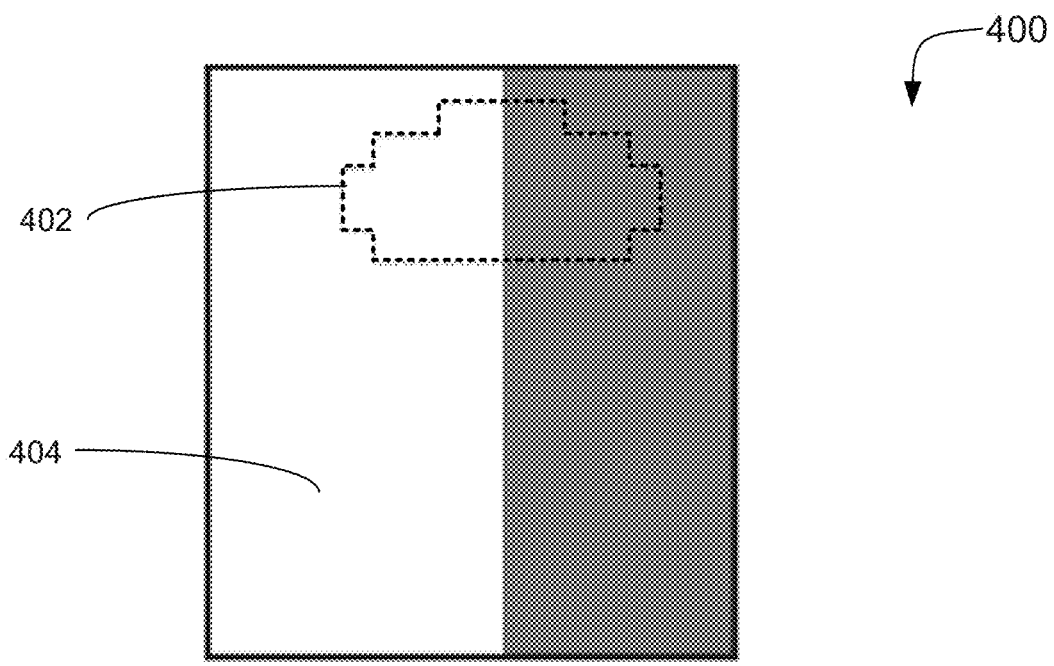
FIGS. 4A-D illustrates an example of a pixel-restoration operation performed in FIG. 3, in accordance with some embodiments.

FIGS. 4A-D illustrates an example image on which a pixel-restoration operation is performed, such as described in regards to FIG. 3. FIG. 4A illustrates an example in which a user selects a region 402 of an image 404 by executing a free-form selection operation of an image-editing application. Dotted lines (or "marching ants") indicate a boundary that corresponds to the region 402. In some cases, an anti-aliasing operation is performed, such as to smooth a visual appearance of the boundary of the region 402. In some instances, the free-form selection operations include executing an edge-smoothing operation, such that a subsequent pixel-modification operation may result in the selected region with smoothened edges. In other instances, the selection operation is generated without any edge-smoothing operation, though any arbitrary region within the selected region may indicate various alpha values that can be modified. In any of the above instances, alpha values of pixels associated with the selected region is modified. As the region 402 is selected, the user selects a paint-bucket operation from various interface operations of the image-editing application. As a region is selected from an underlying image layer of the image, an image-layer snapshot that captures the state of a first image layer is generated and stored. Specifically, the state of the first image layer includes pixel data usable for restoring at least part of the first image layer. The pixel data of the image-layer snapshot can be used to restore the color values (e.g., RGBA values) corresponding to pixels that surround the selected region, as the selected region is further modified and transformed.

Figure 4B:
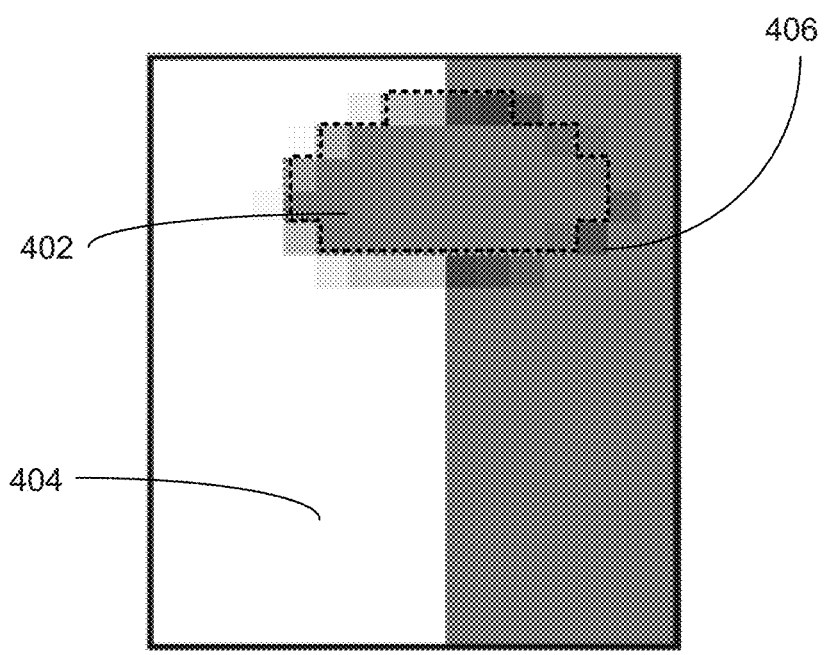

FIG. 4B illustrates an example of the paint-bucket operation, in which the region 402 of the image 404 is converted into a different color. The anti-aliasing operation and/or the edge-smoothing operation executed with the free-form selection operation causes the alpha values of the boundary pixels to be modified, such that the paint-bucket operation changes the color of the boundary pixels. Pixels 406 can correspond to the boundary pixels in which alpha values have been changed.

Figure 4C:
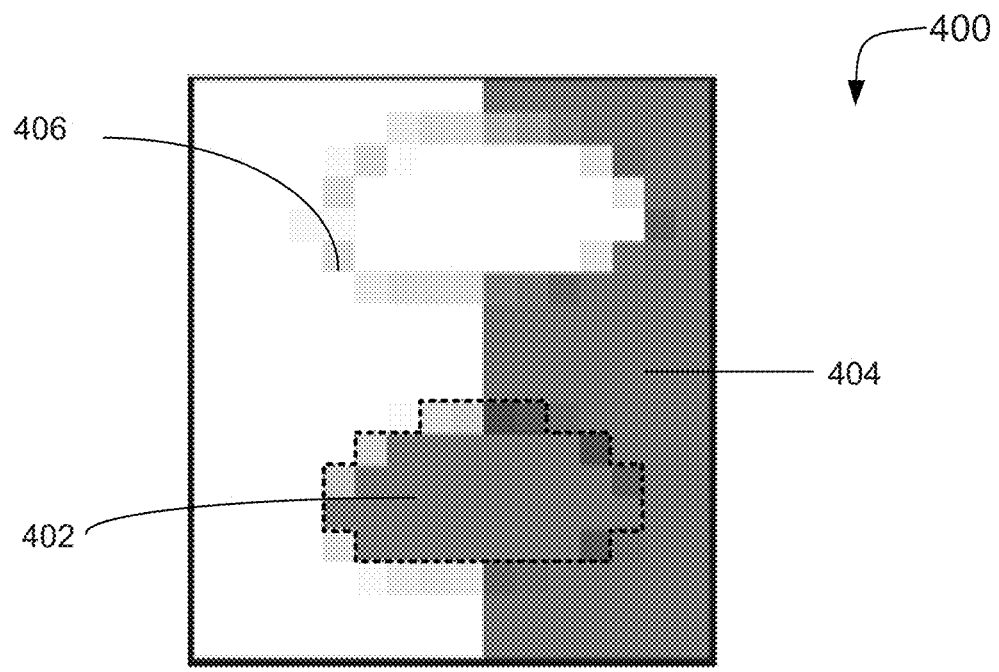

FIG. 4C illustrates an example of a structure-modification operation applied to the region 402 of the image 404. The structure-modification operation can reveal a presence of the pixels 406 which may correspond to an image artifact. In some embodiments, the pixel-adjustment module identifies the pixels 406 by using the image-layer snapshot generated during the region-selection operation specified in FIG. 4A. The pixel-adjustment module uses color attributes of pixels indicated in the snapshot to restore the color values corresponding to each pixel of the pixels 406. As a result, some or all of the image artifacts depicted by the pixels 406 can be removed from the image 404.

Figure 4D:
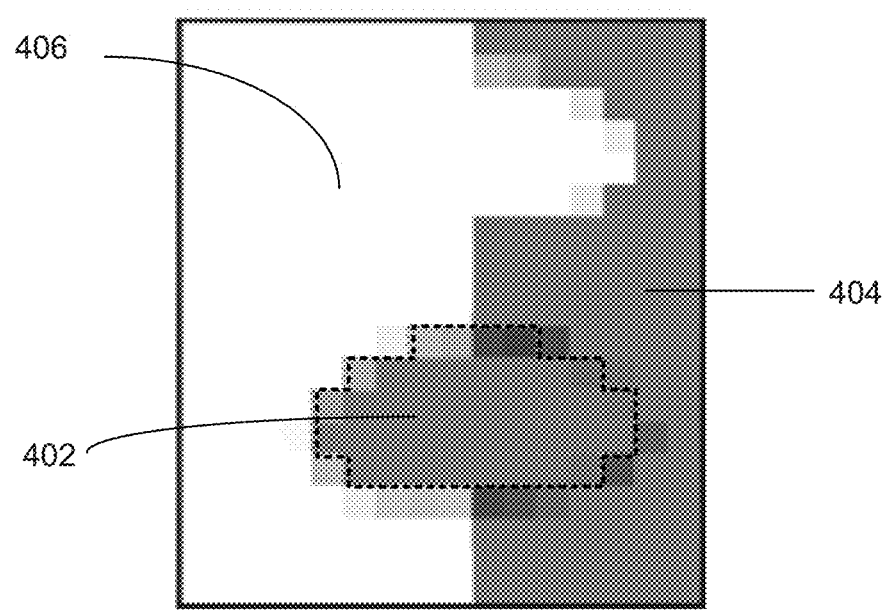

FIG. 4D illustrates an example in which at least a portion of the image artifact has been removed from the image 404. Specifically, one or more pixels of the pixels 406 corresponding to the image artifact have been converted to color values of the background of the image 404. In various embodiments, the pixel-restoration operations continue to be executed while structure-modification operations are performed. Although not shown, a subsequent structure-modification operation on the region 402 can be performed in which the pixel-adjustment module removes additional image artifacts that may be unintentionally generated.

Figure 5:
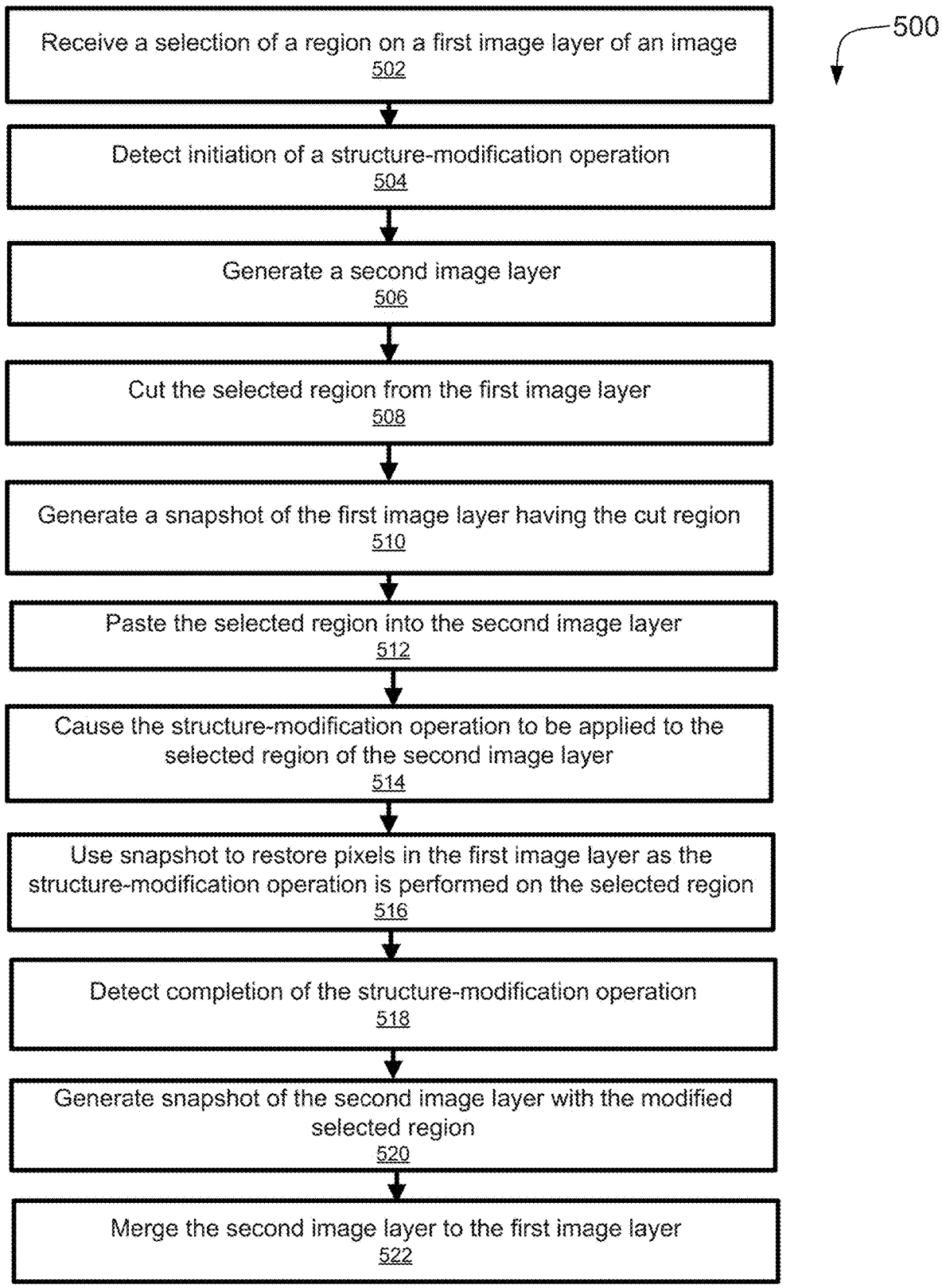
FIG. 5 shows an example of a process for generating multiple image layers for eliminating image artifacts, in accordance with some embodiments.

Example Process for Generating Image-Layer Snapshots During Structure-Modification Operations FIG. 5 shows an example of a process 500 for generating multiple image layers for eliminating image artifacts. At step 502, an image-editing application receives a selection of a region on a first image layer (e.g., an underlying image layer) of an image, such as selection of the region 226 received by the image-editing application 204. In various embodiments, the first image layer depicts one or more graphical elements of an image. The image may include several image layers, in which content in a particular layer can be edited without affecting content corresponding to other image layers. The image-editing application 104 provides a set of user-interface operations that can be executed to select the image region 112. A user-interface operation for selecting the region 112 may include (for example) a free-form selection, a marquee-selection, or an auto-selection operation. In some instances, one or more image-layer snapshots are generated to capture a state of the entire first image layer.

At step 504, a pixel-adjustment module (e.g., the pixel-adjustment module 106 of FIG. 1) detects initiation of a structure-modification operation. In some embodiments, the structure-modification operation includes an image-editing operation that transforms a structure of a selection region of the image. In some instances, the image structure-modification operation is a move operation which can be used to drag the entirety of a single image layer, such as the structure-modification operation applied to the region 402 of the image 404. The structure-modification operation also includes manually relocating the selected region of from a first area of an image to a second area of the image within a canvas of the GUI.

At step 506, the pixel-adjustment module generates a second image layer. In some embodiments, the second image layer corresponds to a floating image layer. As discussed herein, the floating image layer refers to a type of temporary image layer which is similar in function to a normal layer, but is merged back to existing image layers as image-editing operations are completed. In some embodiments, the second image layer is not shown in the GUI.

At step 508, the pixel-adjustment module cuts the selected region from the first image layer. The pixel-adjustment module cuts the selected region from the underlying image layer. In some embodiments, the cut operation includes applying an image mask on pixels along the edges of the selected region. At step 510, the pixel-adjustment module generates a snapshot of the first image layer having the cut region. The pixel-adjustment module generates an image-layer snapshot that corresponds to the underlying image layer from which the selected region was removed.

At step 512, the pixel-adjustment module pastes the selected region into the second image layer. The content of the image corresponding to the selected region is thus cut from the first image layer and inserted into the second image layer. In some instances, the paste operation also includes applying the image mask on pixels along the anti-aliased edges of the second image layer.

At step 514, the pixel-adjustment module causes the structure-modification operation to be applied to the selected region of the second image layer. Specifically, structure-modification operation of the selected region can be applied at the floating image layer but not at the underlying image layer. In some embodiments, the structure-modification operation includes a sequence of multiple image transforms. Additionally or alternatively, other image-editing operations can be performed (e.g., the pixel-modification operation).

At step 516, one or more image-layer snapshots are used to restore changes to pixels surrounding the cut region of the first image layer. The pixel-adjustment module may execute a pixel-restoration operation to use the pixel data of the image-layer snapshot to restore the color values corresponding to pixels associated with the cut region of the first image layer, while structure-modification operation is being performed on the pasted region of the second image layer. In various embodiments, the pixel-restoration operations continue to restore pixel values as the selected region is further modified and transformed during the image-editing operations.

At step 518, the pixel-adjustment module detects completion of the structure-modification operation. In some instances, the indication of the completion includes an interaction with a user-interface object of the GUI after the selected region was modified through the second image layer. At step 520, the pixel-adjustment module generates a snapshot of the second image layer having the modified selected region. In effect, pixel data of the image-layer snapshot corresponding to the second image layer can be used to restore the state of the floating image layer in later image-editing operations. In some embodiments, the pixel data of the generated image-layer snapshot of the second image layer can be subsequently stored and used for additional iterations of process 500 as illustrated in FIG. 5. Additionally or alternatively, the pixel data of the generated image-layer snapshot of the second image layer can be subsequently stored and used for other processes of using image-layer snapshots to eliminate image artifacts, e.g., process 700 that is illustrated below in FIG. 7.

At step 522, the pixel-adjustment module merges the second image layer to the first image layer. In some embodiments, the floating image layer is deleted and irretrievable after the merging of the two image layers. Subsequent image-editing operations can be performed on the merged layer. In some instances, subsequent image-editing operations causes one or more image-layer snapshots to be used to replace the merged layer. Process 500 terminates thereafter.

Figure 6A:
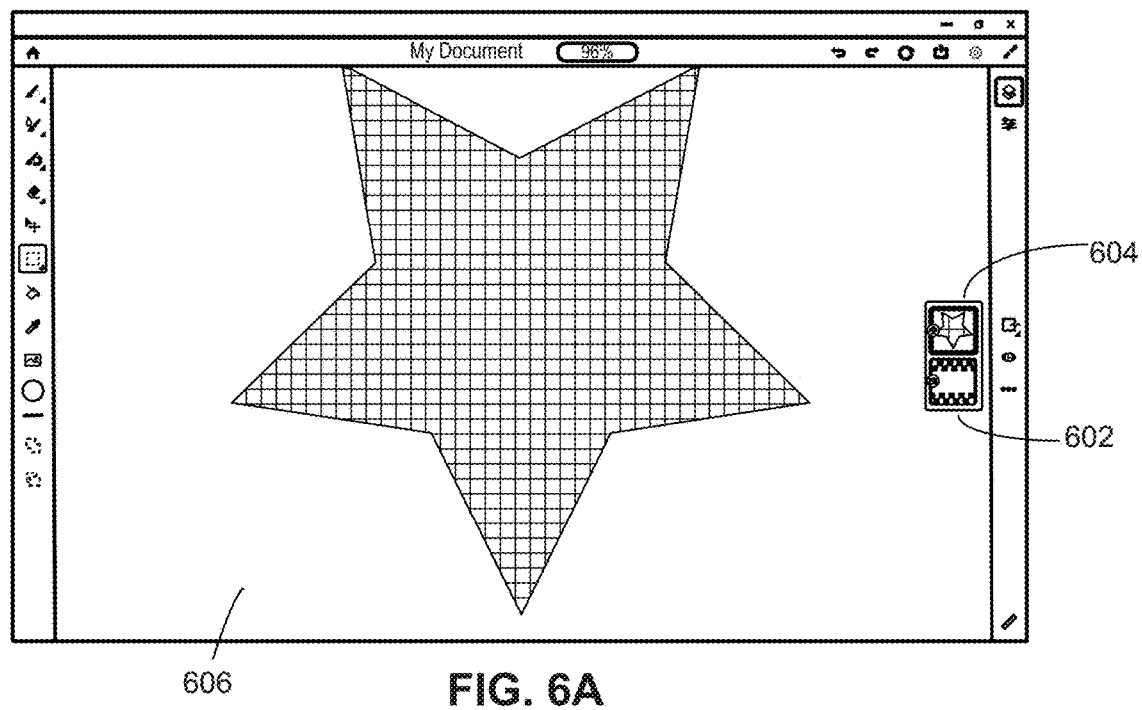
FIGS. 6A-E illustrates an example of a process of using image-layer snapshots during structure-modification operations, in accordance with some embodiments.

Example Screenshot Images Illustrating the Process of Using Image-Layer Snapshots to Eliminate Image Artifacts FIGS. 6A-E illustrate an example of using image-layer snapshots during structure-modification operations, in accordance with some embodiments. In some embodiments, the example images or operations illustrated in FIGS. 6A-E are provided by an image-editing application that includes a pixel-adjustment module, such as the image-editing application 104 and the pixel-adjustment module 106. FIG. 6A depicts an example of an image having a first image layer 602 and a second image layer 604 that are presented on a GUI 606 of the image-editing application. The first image layer 602 is an image layer without any image content. The second image layer 604 is an underlying image layer that includes a star object depicted therein. In various embodiments, the image layers can be viewed as thumbnails of the GUI, on which different types of layer-modification operations can be performed. In some instances, the image includes only one image layer, in which the background layer has imported the image content.

Figure 6B:
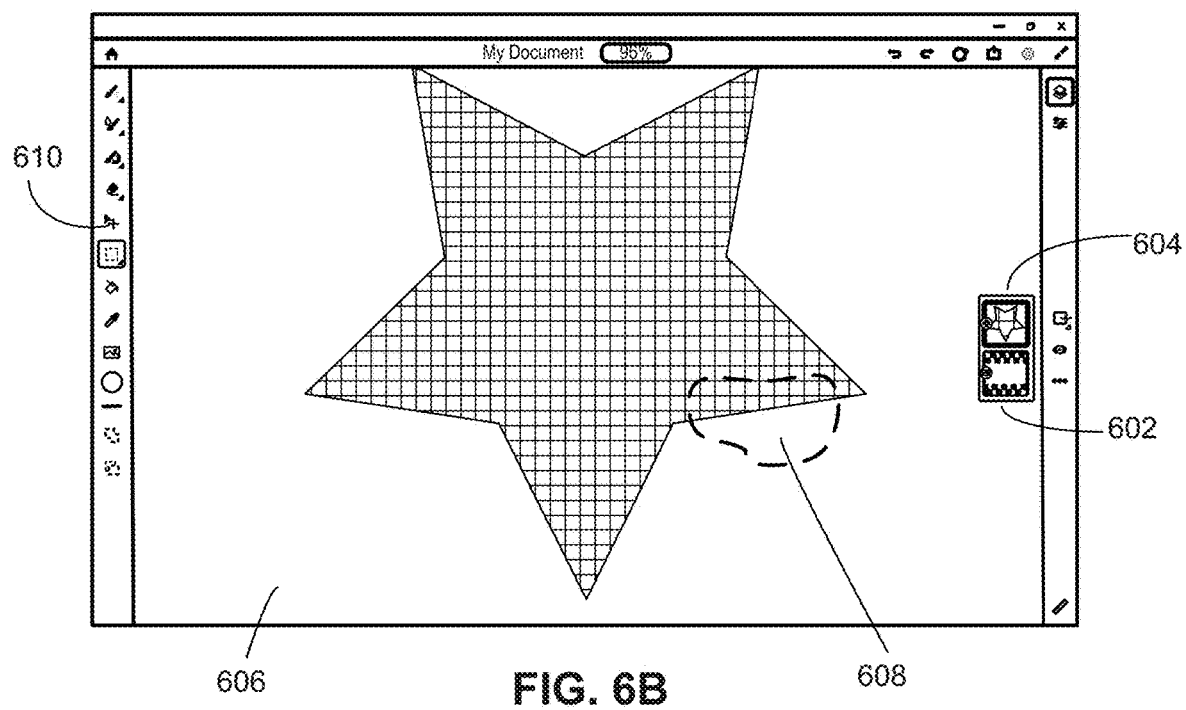

FIG. 6B depicts an example image region 608 that is selected from the underlying image layer 602. In some embodiments, a free-form selection operation is used to select the image region 608, in which each edge of the boundary was drawn (e.g., via a user interface input) for the selected region. In some embodiments, one or more edges of the boundary can be processed with an anti-aliasing operation to remove jagged appearance of the border. In some instances, the image region 608 corresponds to a part of the image content of the underlying image layer, though the image region 608 can correspond to any other parts of the layer that does not display the content. At this point, the pixel-adjustment module detects an initiation of a structure-modification operation. The structure-modification operation may include interacting with a GUI object 610.

Figure 6C:
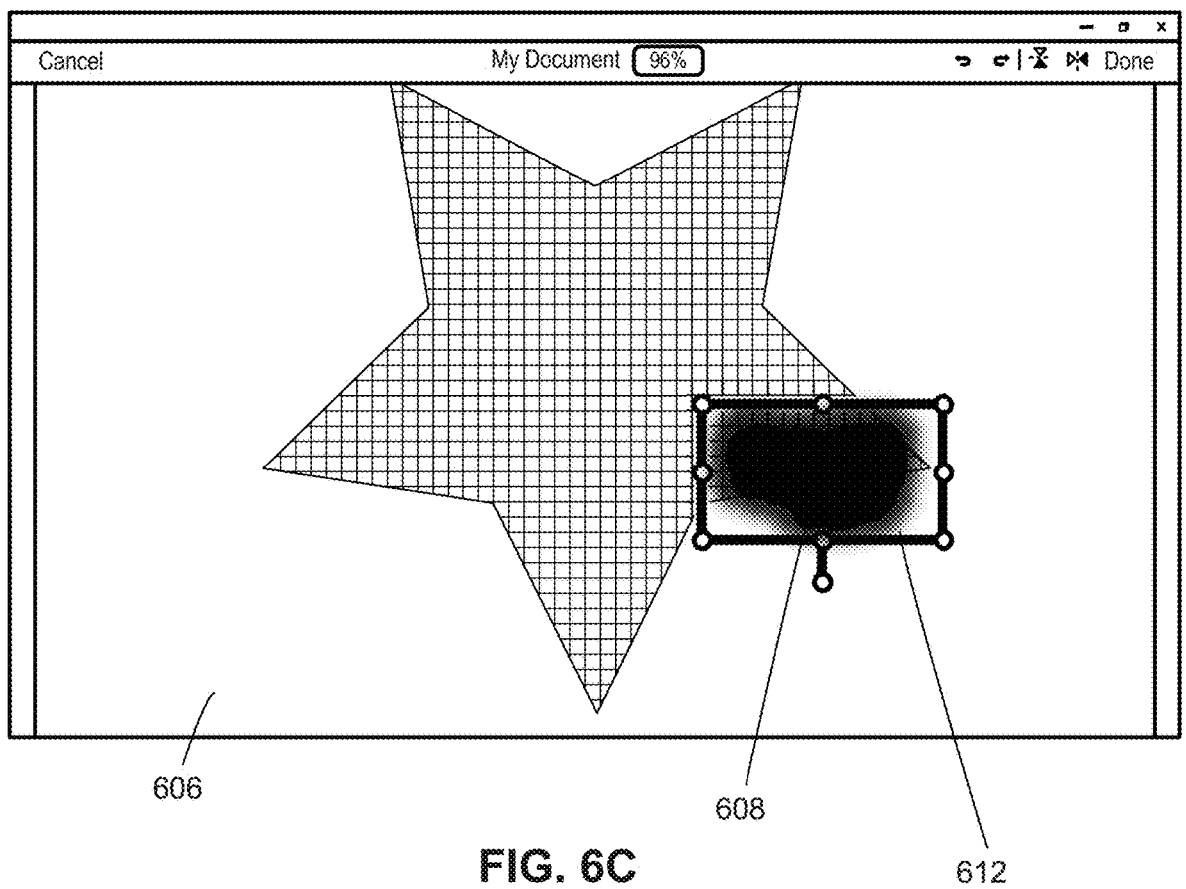

FIG. 6C depicts an example in which the pixel-adjustment module generates a floating image layer 612 for the selected region 608 in response to the indication that the structure-modification operation will be performed. The selected region 608 depicts fuzzy edges due to an edge-smoothing operation. In some embodiments, the floating image layer 612 is a transparent image layer overlaid on the underlying image layer. In various embodiments, the image-editing application permits image-editing operations on the image region 608, but denies the floating image layer 612 to be edited or removed. To generate the floating image layer 612 is generated, the pixel-adjustment module cuts the selected region from the underlying image layer and pastes the selected region into the floating image layer 612. Additionally or alternatively, one or more edges of the cut region can be anti-aliased (soft) due to the cutting operation performed by the pixel-adjustment module. In some embodiments, the pixel-adjustment module generates snapshot of the underlying image layer having the cut region.

Figure 6D:
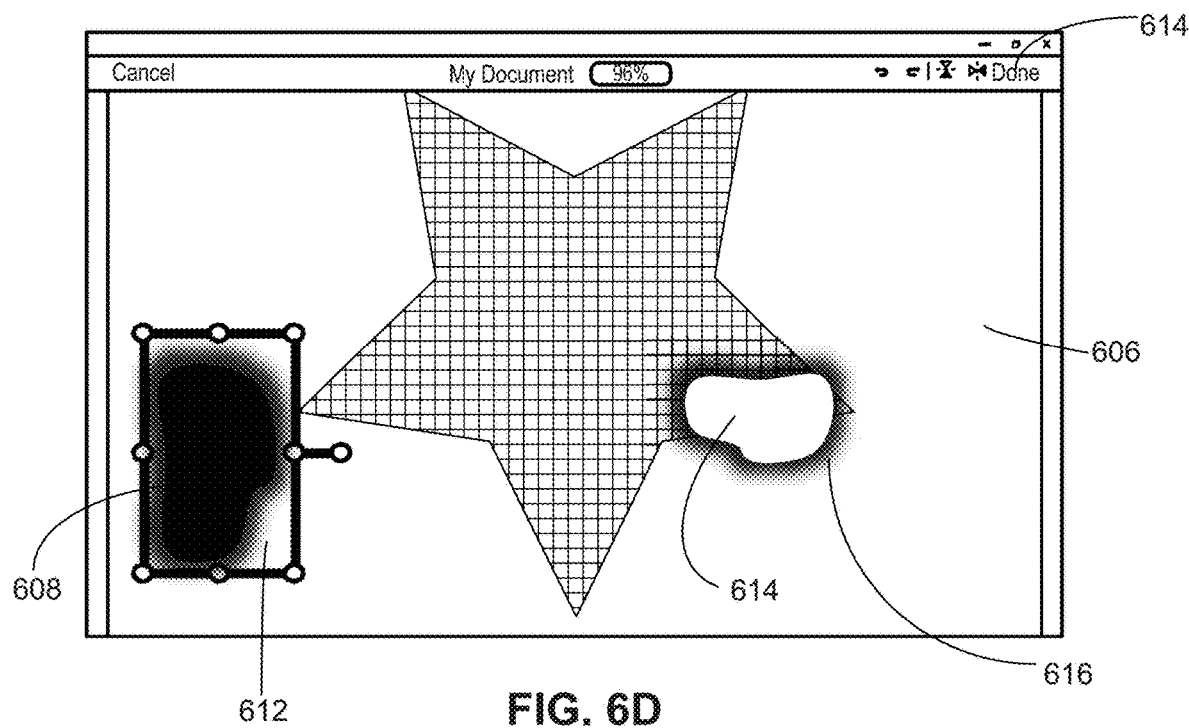

FIG. 6D depicts an example in which the structure-modification operations are performed on the image region 608 of the floating image layer 612. As illustrated herein, the image region 608 in the floating image layer 612 is relocated to another location of the canvas. An empty region 614 is created on the underlying image layer due to the relocation of the image region. The image 606 also depicts an image artifact 616 that was unintentionally generated due to the pixel-modification operation and the structure-modification operation. In addition, the image artifact 616 is located on a location at which the image region 608 was initially selected. In various embodiments, the pixel-adjustment module may perform pixel-restoration operations sufficiently early during the structure-modification operations that the image artifact 616 does not appear in the image 606. In addition to the move operation, other structure-modification operations (e.g., rotate operation, scale operation) are performed to rotate the image region 608 counter-clockwise and enlarge the selected region. A pixel-modification operation is also performed to change the pixels of the image region 608 to a black color. In various embodiments, the pixel-adjustment module detects an indication of completion of the structure-modification operation, based on a user-interaction with a GUI interface object 614. In some embodiments, color values of one or more pixels corresponding to the image artifact 616 in the empty region 614 can be restored based on at least one of the generated image-layer snapshots.

Figure 6E:
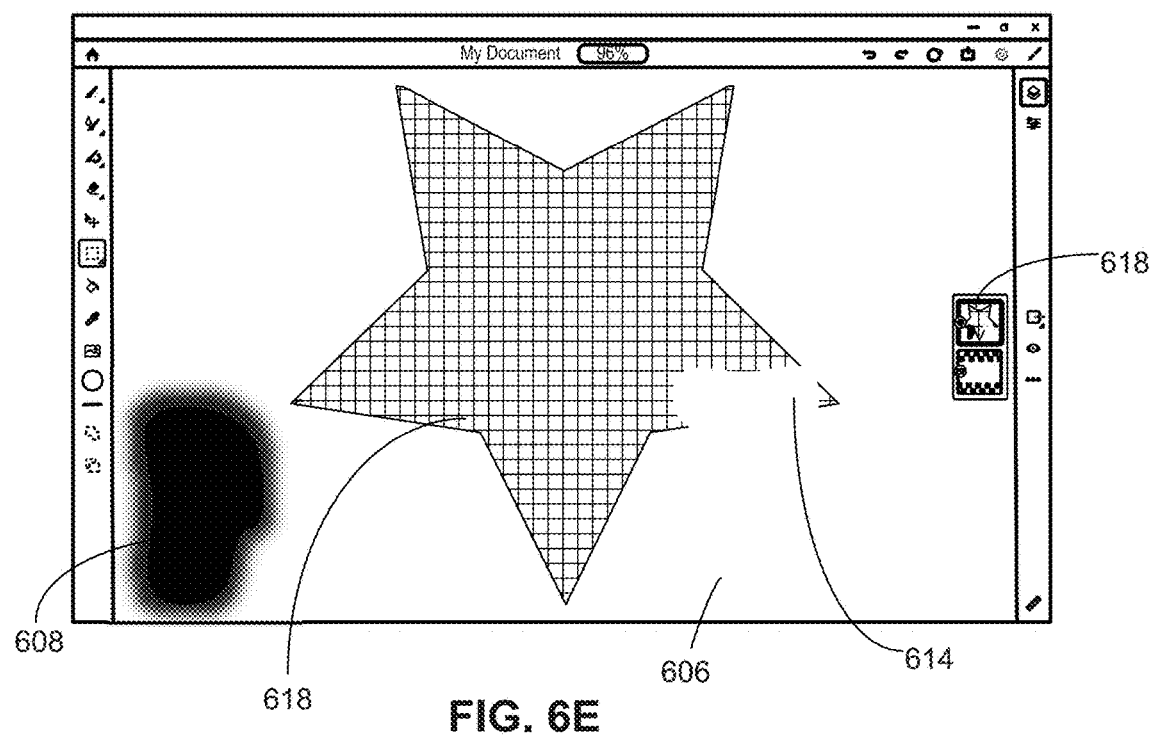

FIG. 6E depicts an example in which the pixel-adjustment module merges the floating image layer 612 to the underlying image layer 604. As the pixel-adjustment module detects completion of the structure-modification operation, the pixel-adjustment module generates snapshot of the floating image layer with the modified region 608, such that pixel data of the image-layer snapshot corresponding to the floating image layer can be used to restore the state of the floating image layer in later image-editing operations. After the snapshot is generated, the merging operation is performed. An updated image 618 depicted on a merged layer 618 is shown on the GUI 606.

Figure 7:
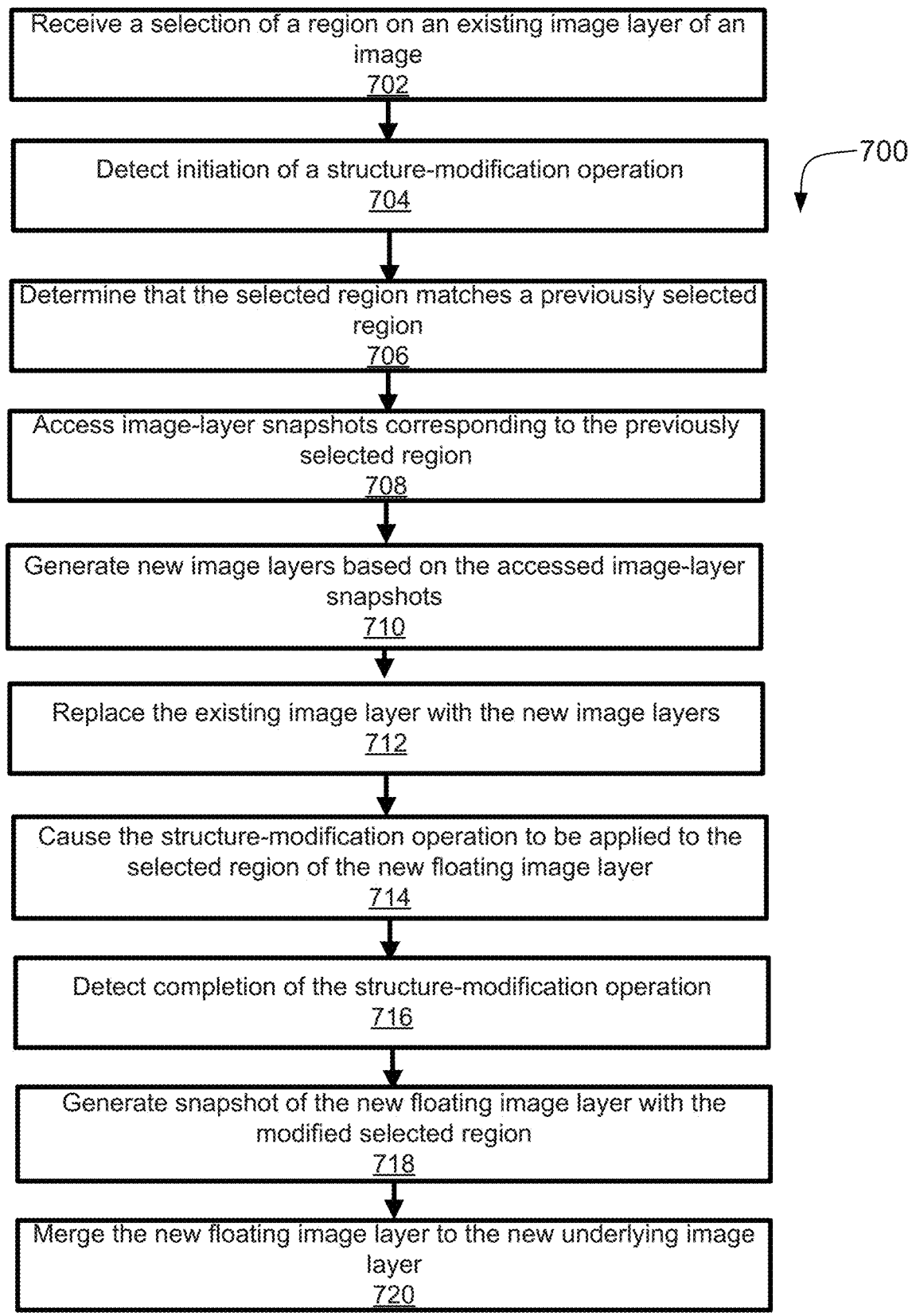
FIG. 7 shows an example of a process for using image-layer snapshots to restore image layers and replace an existing image layer, in accordance with some embodiments.

Example Process for Using Image-Layer Snapshots to Replace an Existing Image Layer FIG. 7 shows an example of a process 700 for using image-layer snapshots to restore image layers and replace an existing image layer in accordance with some embodiments. In some cases, the pixel-adjustment module replaces an existing image layer with image layers derived from one or more of the generated image-layer snapshots, in order to reduce a number of image-editing operations. In some cases, reducing a number of image-editing operations decreases the chances of accidentally generating image artifacts. At step 702, an image-editing application receives a selection of a region on an existing image layer of an image, such as selection of the region 226 received by the image-editing application 204. In some embodiments, the existing image layer corresponds to a merged layer. The merged layer can be an image layer outputted by previous operations performed in the example process 500 of FIG. 5.

At step 704, a pixel-adjustment module (e.g., the pixel-adjustment module 106 of FIG. 1) detects initiation of a structure-modification operation. In some embodiments, the structure-modification is a subsequent operation after the merged layer is generated. In various embodiments, the initiation of the structure-modification operation includes a user interaction with one or more GUI elements of the image-editing application.

At step 706, the pixel-adjustment module determines that the selected region matches a previously selected region. For example, the selected region can match the previously selected region based on a determination that size and shape of both selected regions are equal. In some embodiments, the selected region does not match the previously selected region if their color attributes (e.g., RGB values) are different even when the size and shape are the same. This is because the pixel values of the snapshots no longer apply to the selected region with the modified pixel values. In these embodiments, the pixel-adjustment module generates an additional set of snapshots as illustrated in FIG. 5. Additionally or alternatively, the pixel-adjustment module determines that the selected region matches the previously selected region when alpha values are different for the two selected regions, as long as the size, shape, and RGB values of the selected regions are the same.

At step 708, the pixel-adjustment module accesses one or more image-layer snapshots corresponding to the previously selected region. In various embodiments, a first image-layer snapshot corresponds to an underlying image layer from which the selected region has been removed, and a second image-layer snapshot corresponds to a floating image layer on which the selected region has been pasted.

At step 710, the pixel-adjustment module generates one or more new image layers based on the image-layer snapshots. The pixel-adjustment module processes pixel data stored in the image-layer snapshots to generate the new image layers. In various embodiments, the new image layers include a new underlying image layer corresponding to a first image-layer snapshot and a new floating image layer corresponding to a second image-layer snapshot. Both of the new image layers correspond to the previously selected region, which matches the currently selected region. By generating the new image layers from snapshots rather than processing directly on the merged layer, the pixel-adjustment module preserves computing resources to generate and store new image snapshots. Further, by using the image-layer snapshots, a risk of generating additional image artifacts during processing of the merged layer can be reduced.

At step 712, the pixel-adjustment module replaces the existing image layer with the new image layers. In some embodiments, the pixel-adjustment module replaces the existing image layer with the new underlying image layer without the selected region. The new floating image layer including the selected region can be added. In some cases, two new image layers replace a single image layer. For example, pixel data in the existing image layer can be replaced with pixel data from one or both of the new underlying image layer or the new floating image layer.

At step 714, the pixel-adjustment module causes the structure-modification operation to be applied to the selected region of the new floating image layer. Specifically, the structure-modification operation of the selected region can be applied at the previously selected region depicted on the new floating image layer. In some instances, other image-editing operations can be performed (e.g., the pixel-modification operation) on the new floating image layer while the structure-modification operation is being performed. The above sequence of operations can be perform repeatedly until an indication of a completion of the structure-modification operation is detected.

At step 716, the pixel-adjustment module detects completion of the structure-modification operation. For example, the indication of the completion may include a user-interaction with a user-interface object indicating completion of the structure-modification operation of the selected region.

At step 718, the pixel-adjustment module generates an image-layer snapshot of the new floating image layer with the modified selected region. In effect, pixel data of the generated image-layer snapshot corresponding to the floating image layer can be used to restore the state of the new floating image layer in later image-editing operations. In some embodiments, the pixel data of the generated image-layer snapshot can be subsequently stored and used for additional iterations of replacing an image layer as illustrated in FIG. 7.

At step 720, the pixel-adjustment module merges the new floating image layer to the new underlying image layer. In some embodiments, the image-layer snapshots are deleted in response to a determination that pixel-modification operation has been performed on pixels of image that correspond to the selected region captured by the image-layer snapshot. In some cases, process 700 terminates thereafter.

Example Process for Restoring Alpha Values to Remove Image Artifacts

Figure 8:
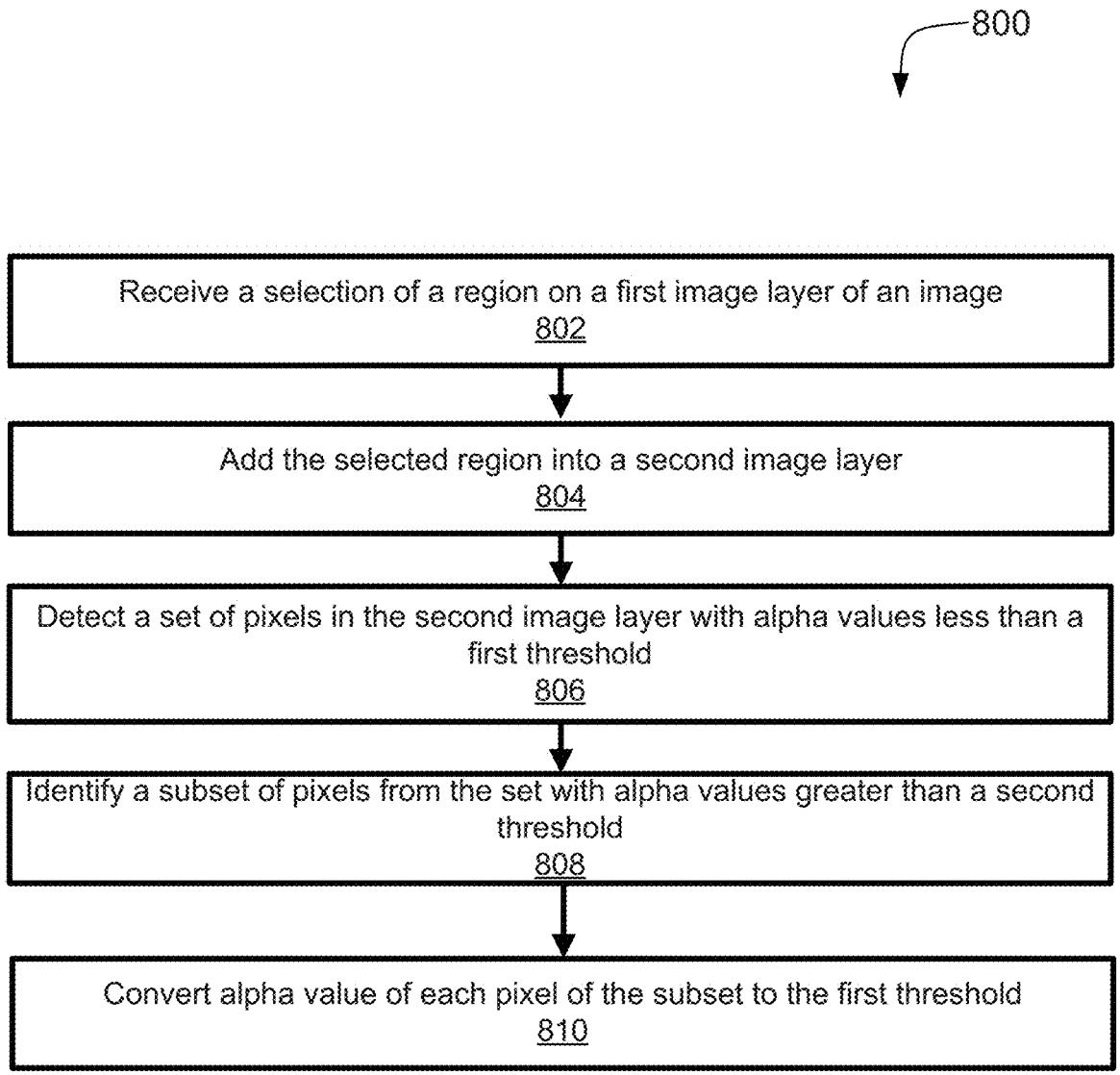
FIG. 8 shows an example of a process for restoring alpha values of a selected image region to remove image artifacts, in accordance with some embodiments.

FIG. 8 shows an example of a process 800 for restoring alpha values of a selected image region to remove image artifacts in accordance with some embodiments. At step 802, an image-editing application (e.g., the image application 104 of FIG. 1) receives a selection of a region on a first image layer (e.g., an underlying image layer) of an image. For example, the selection of a region can be performed by one or more region-selection operations, including a free-form selection operation. In some embodiments, the selected region includes a boundary of pixels with one or more anti-aliased and/or smoothened edges.

At step 804, the image-editing application adds the selected region into a second image layer (e.g., a floating image layer). In some embodiments, the selected region is added into the second image layer through a cut-and-paste operation. Specifically, a cut operation involves applying an image mask on pixels along the anti-aliased edges, and a paste operation involves applying the image mask again on pixels along the anti-aliased edges of another image layer. The masking operations cause decrease of alpha values of pixels that correspond to the anti-aliased edges corresponding to the boundary of the selected region.

At step 806, a pixel-adjustment module (e.g., the pixel-adjustment module 106 of FIG. 1) detects a set of pixels of the second image layer that indicate alpha values that are less than a first threshold. In some embodiments, the first threshold is an alpha value of 1, which indicates complete opacity and lack of transparency for a given pixel. As such, a pixel having an alpha value less than 1 indicates an existence of a degree of transparency. The detected set of pixels may include pixels that correspond to at least part of the second image layer that are outside of the selection region.

At step 808, the pixel-adjustment module identifies a subset of pixels from the detected set of pixels that correspond to an alpha value greater than a second predetermined threshold. In some embodiments, the second threshold is an alpha value of 0, which indicates complete transparency and lack of opacity. Additionally or alternatively, the second threshold is an alpha value of 0.5. In some embodiments, pixels that correspond to alpha values greater than 0 indicate that the pixels are not completely transparent. Because alpha values corresponding to the subset of pixels indicate a value between 0 and 1, the identified subset of pixels likely correspond to a region within the anti-aliased edges of the border for which their alpha values have been decreased due to one or more previous image-editing operations.

For each pixel of the identified subset of pixels, the pixel-adjustment module converts the pixel to indicate an alpha value corresponding to the first threshold (such as described in regards to step 810). In effect, the pixel of the subset having a decreased alpha value is converted to an increased value. In this manner, the pixel-adjustment module can restore the pixels to their original alpha values, such that pixels along the edges of the selected region retain their color and opacity. The image artifact caused by lighter pixels are eliminated. In some cases, process 800 terminates thereafter.

Example Computing Environment

Figure 9:
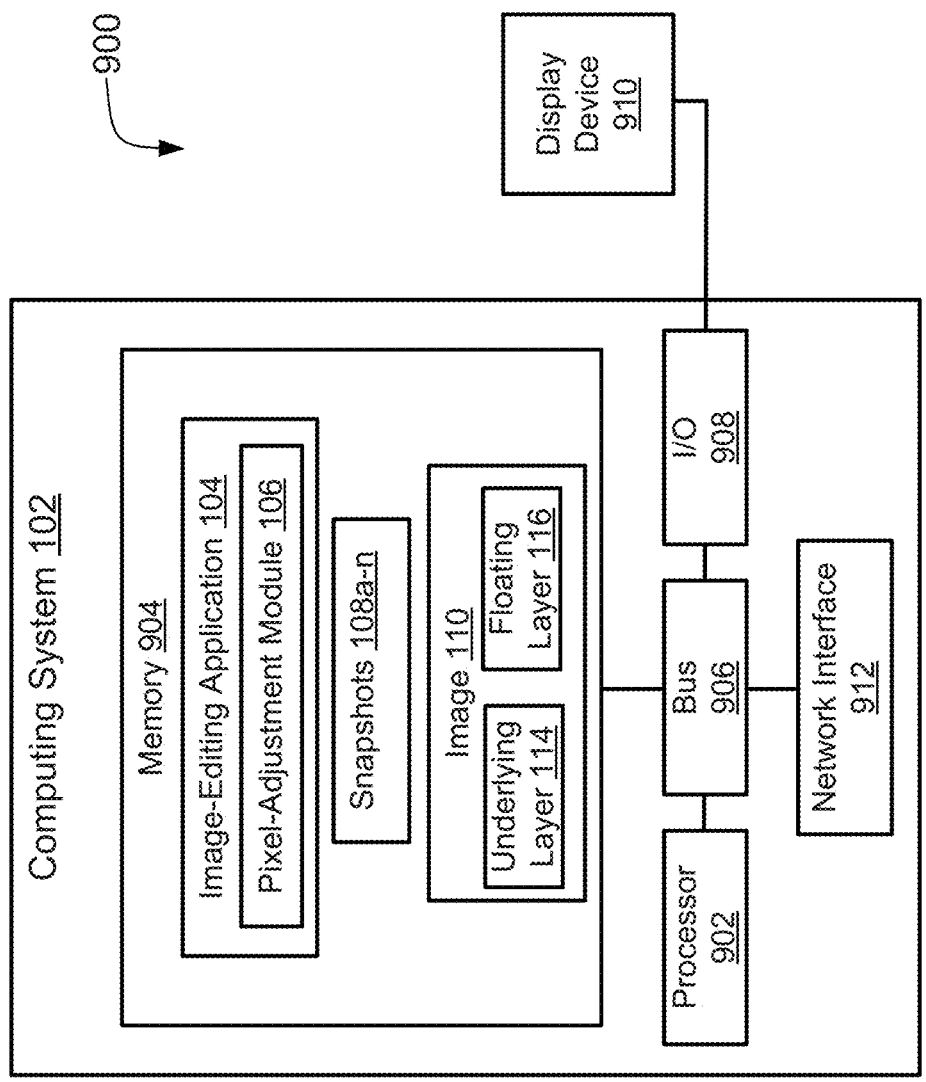
FIG. 9 depicts an example of a computing system configured for eliminating image artifacts, in accordance with some embodiments.

Any suitable computing system or group of computing systems can be used for performing the operations described herein. For example, FIG. 9 depicts an example of a computing system 900 that can implement any of the computing systems or environments discussed above. In some embodiments, the computing system 900 includes a processing device 902 that executes the image-editing application 104 including the pixel-adjustment module 106, a memory that stores various data computed or used by the image-editing application 104, an input device 914 (e.g., a mouse, a stylus, a touchpad, a touchscreen, etc.), and an output device 916 that presents output to a user (e.g., a display device that displays graphical content generated by the image-editing application 104). For illustrative purposes, FIG. 9 depicts a single computing system on which the image-editing application 104 is executed, and the input device 914 and output device 916 are present. But these applications, datasets, and devices can be stored or included across different computing systems having devices similar to the devices depicted in FIG. 9.

The example of FIG. 9 includes a processing device 902 communicatively coupled to one or more memory devices 904. The processing device 902 executes computer-executable program code stored in a memory device 904, accesses information stored in the memory device 904, or both. Examples of the processing device 902 include a microprocessor, an application-specific integrated circuit ("ASIC"), a field-programmable gate array ("FPGA"), or any other suitable processing device. The processing device 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, such as input device 914, output device 916, or other input or output devices. For example, the computing system 900 is shown with one or more input/output ("I/O") interfaces 908. An I/O interface 908 can receive input from input devices or provide output to output devices. One or more buses 910 are also included in the computing system 900. Each bus 910 communicatively couples one or more components of the computing system 900 to each other or to an external component.

The computing system 900 executes program code that configures the processing device 902 to perform one or more of the operations described herein. The program code includes, for example, code implementing the image-editing application 104 or other suitable applications that perform one or more operations described herein. The program code may be resident in the memory device 904 or any suitable computer-readable medium and may be executed by the processing device 902 or any other suitable processor. In some embodiments, all modules in the image-editing application 104 (e.g., the pixel-adjustment module 106) are stored in the memory device 904, as depicted in FIG. 9. In additional or alternative embodiments, one or more of these modules from the image-editing application 104 are stored in different memory devices of different computing systems.

In some embodiments, the computing system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computing system 900 is able to communicate with one or more other computing devices (e.g., a computing device that receives inputs for image-editing application 104 or displays outputs of the image-editing application 104) via a data network using the network interface device 912.

An input device 914 can include any device or group of devices suitable for receiving visual, auditory, or other suitable input that controls or affects the operations of the processing device 902. Non-limiting examples of the input device 914 include a touchscreen, stylus, a mouse, a keyboard, a microphone, a separate mobile computing device, etc. An output device 916 can include any device or group of devices suitable for providing visual, auditory, or other suitable sensory output. Non-limiting examples of the output device 916 include a touchscreen, a monitor, a separate mobile computing device, etc.

Although FIG. 9 depicts the input device 914 and the output device 916 as being local to the computing device that executes the image-editing application 104, other implementations are possible. For instance, in some embodiments, one or more of the input device 914 and the output device 916 can include a remote client-computing device that communicates with the computing system 900 via the network interface device 912 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
    accessing, by a pixel-adjustment module that is implemented by a processor executing program instructions, an image comprising a first image layer, wherein the program instructions implemented by the processor are stored in a non-transitory computer-readable storage medium;
    receiving, by the pixel-adjustment module, an indication of a selected region of the first image layer;
    responsive to receiving the indication of the selected region, generating, by the pixel-adjustment module, a first snapshot of the first image layer, the first snapshot including pixel data for restoring a first state of the first image layer;
    detecting, by the pixel-adjustment module, an initiation of an image structure-modification operation for the selected region; and
    responsive to detecting the initiation of the image structure-modification operation:
        generating, by the pixel-adjustment module, a second image layer;
        modifying, by the pixel-adjustment module, a pixel of the second image layer to include data from the selected region, wherein the image structure-modification operation is applied to the pixel of the second image layer; and
        modifying, by the pixel-adjustment module, a pixel in the selected region to omit data transformed by the image structure-modification operation and to include at least part of the pixel data from the first snapshot.

2. The method of claim 1, further comprising:
    modifying, by the pixel-adjustment module, an additional pixel in the selected region of the first image layer to remove pixel data corresponding to the selected region of the first image layer; and
    generating, by the pixel-adjustment module, a second snapshot of the first image layer after the additional pixel in the selected region is modified, wherein the second snapshot includes pixel data for restoring a second state of the first image layer at which the additional pixel in the selected region is modified.

3. The method of claim 2, further comprising:
    detecting, by the pixel-adjustment module, an additional indication that the image structure-modification operation applied to the pixel of the second image layer has been completed;
    responsive to detecting the additional indication, generating, by the pixel-adjustment module, a third snapshot of the second image layer, wherein the third snapshot specifies a third state of the second image layer at which the image structure-modification operation has been applied to the pixel of the second image layer; and
    merging, by the pixel-adjustment module, the second image layer into the first image layer to form a merged image layer.

4. The method of claim 3, further comprising:
    detecting, by the pixel-adjustment module, a pixel-modification operation being applied to one or more pixels of the merged image layer that correspond to the selected region; and
    deleting, by the pixel-adjustment module, the third snapshot corresponding to the second image layer.

5. The method of claim 3, further comprising:
    detecting, by the pixel-adjustment module, an additional initiation of an additional image structure-modification operation on the merged image layer;
    determining, by the pixel-adjustment module, that the additional image structure-modification operation correspond to the selected region;
    determining, by the pixel-adjustment module, whether the second snapshot and the third snapshot exist; and
    in response to determining that the second snapshot and the third snapshot exist, replacing, by the pixel-adjustment module, the merged image layer with:
        the first image layer corresponding to the second state based on the second snapshot; and
        the second image layer corresponding to the third state based on the third snapshot, wherein the additional image structure-modification operation is applied on the pixel of the second image layer.

6. The method of claim 3, further comprising deleting the first snapshot in response to receiving a further indication to deselect the selected region.

7. The method of claim 1, wherein the image structure-modification operation includes a resize operation, a move operation, and/or a rotate operation.

8. The method of claim 1, wherein the first snapshot is generated before a pixel-modification operation is applied to change one or more pixel attributes corresponding to the selected region.

9. The method of claim 8, wherein the pixel-modification operation includes a painting operation, a stroke operation, a paint-bucket operation, and/or a fill operation.

10. The method of claim 1, wherein modifying the pixel of the second image layer to include the data from the selected region of the first image layer further comprises:
    detecting a set of pixels in the second image layer, wherein each pixel of the set of pixels indicates an alpha value that falls under a first predetermined threshold, and wherein the alpha value corresponds to a degree of transparency associated with a corresponding pixel;

identifying a subset of pixels from the set of pixels, wherein each pixel of the subset of pixels indicates a corresponding alpha value that exceeds a second predetermined threshold; and converting the corresponding alpha value corresponding to each pixel of the subset of pixels to the first predetermined threshold.

11. A system comprising:

one or more data processors; and a non-transitory computer readable storage medium containing instructions which, when executed on the one or more data processors, cause the one or more data processors to perform actions including:

accessing, by a pixel-adjustment module that is implemented by the one or more data processors executing program instructions, an image comprising a first image layer;

receiving, by the pixel-adjustment module, an indication of a selected region of the first image layer;

responsive to receiving the indication of the selected region, generating, by the pixel-adjustment module, a first snapshot of the first image layer, the first snapshot including pixel data for restoring a first state of the first image layer;

detecting, by the pixel-adjustment module, an initiation of an image structure-modification operation for the selected region; and responsive to detecting the initiation of the image structure-modification operation:

generating, by the pixel-adjustment module, a second image layer;

modifying, by the pixel-adjustment module, a pixel of the second image layer to include data from the selected region, wherein the image structure-modification operation is applied to the pixel of the second image layer; and modifying, by the pixel-adjustment module, a pixel in the selected region to omit data transformed by the image structure-modification operation and to include at least part of the pixel data from the first snapshot.

12. The system of claim 11, wherein the instructions further cause the one or more data processors to perform actions including:

modifying an additional pixel in the selected region of the first image layer to remove pixel data corresponding to the selected region of the first image layer; and generating a second snapshot of the first image layer after the additional pixel in the selected region is modified, wherein the second snapshot includes pixel data for restoring a second state of the first image layer at which the additional pixel in the selected region is modified.

13. The system of claim 12, wherein the instructions further cause the one or more data processors to perform actions including:

detecting an additional indication that the image structure-modification operation applied to the pixel of the second image layer has been completed;

responsive to detecting the additional indication, generating a third snapshot of the second image layer, wherein the third snapshot specifies a third state of the second image layer at which the image structure-modification operation has been applied to the pixel of the second image layer; and merging the second image layer into the first image layer to form a merged image layer.

14. The system of claim 11, wherein the first snapshot is generated before a pixel-modification operation is applied to change one or more pixel attributes corresponding to the selected region.

15. The system of claim 11, wherein modifying the pixel of the second image layer to include the data from the selected region of the first image layer further comprises:

detecting a set of pixels in the second image layer, wherein each pixel of the set of pixels indicates an alpha value that falls under a first predetermined threshold, and wherein the alpha value corresponds to a degree of transparency associated with a corresponding pixel;

identifying a subset of pixels from the set of pixels, wherein each pixel of the subset of pixels indicates a corresponding alpha value that exceeds a second predetermined threshold; and converting the corresponding alpha value corresponding to each pixel of the subset of pixels to the first predetermined threshold.

16. A computer program product tangibly embodied in a non-transitory machine-readable storage medium, including instructions configured to cause one or more data processors to perform actions including:

accessing, by a pixel-adjustment module that is implemented by the one or more data processors executing program instructions, an image comprising a first image layer;

receiving, by the pixel-adjustment module, an indication of a selected region of the first image layer;

responsive to receiving the indication of the selected region, generating, by the pixel-adjustment module, a first snapshot of the first image layer, the first snapshot including pixel data for restoring a first state of the first image layer;

detecting, by the pixel-adjustment module, an initiation of an image structure-modification operation for the selected region; and responsive to detecting the initiation of the image structure-modification operation:

generating, by the pixel-adjustment module, a second image layer;

modifying, by the pixel-adjustment module, a pixel of the second image layer to include data from the selected region, wherein the image structure-modification operation is applied to the pixel of the second image layer; and modifying, by the pixel-adjustment module, a pixel in the selected region to omit data transformed by the image structure-modification operation and to include at least part of the pixel data from the first snapshot.

17. The computer program product of claim 16, wherein the instructions are further configured to cause the one or more data processors to perform actions including:

modifying an additional pixel in the selected region of the first image layer to remove pixel data corresponding to the selected region of the first image layer; and generating a second snapshot of the first image layer after the additional pixel in the selected region is modified, wherein the second snapshot includes pixel data for restoring a second state of the first image layer at which the additional pixel in the selected region is modified.

18. The computer program product of claim 17, wherein the instructions are further configured to cause the one or more data processors to perform actions including:

detecting an additional indication that the image structure-modification operation applied to the pixel of the second image layer has been completed;

responsive to detecting the additional indication, generating a third snapshot of the second image layer, wherein the third snapshot specifies a third state of the second image layer at which the image structure-modification operation has been applied to the pixel of the second image layer; and merging the second image layer into the first image layer to form a merged image layer.

19. The computer program product of claim 18, wherein the instructions are further configured to cause the one or more data processors to perform actions including:

detecting a pixel-modification operation being applied to one or more pixels of the merged image layer that correspond to the selected region; and deleting the third snapshot corresponding to the second image layer.

20. The computer program product of claim 18, wherein the instructions are further configured to cause the one or more data processors to perform actions including:

detecting an additional initiation of an additional image structure-modification operation on the merged image layer;

determining that the additional image structure-modification operation correspond to the selected region;

determining whether the second snapshot and the third snapshot exist; and in response to determining that the second snapshot and the third snapshot exist, replacing the merged image layer with:

the first image layer corresponding to the second state based on the second snapshot; and the second image layer corresponding to the third state based on the third snapshot, wherein the additional image structure-modification operation is applied on the pixel of the second image layer.

\* \* \* \* \*